US012676873B2

(12) United States Patent
Xue et al.

(10) Patent No.: US 12,676,873 B2
(45) Date of Patent: Jul. 7, 2026

(54) METHOD, APPARATUS, AND SYSTEM FOR DETERMINING DATA FLOW INFORMATION

(71) Applicant: HUAWEI TECHNOLOGIES CO., LTD., Shenzhen (CN)

(72) Inventors: Li Xue, Nanjing (CN); Weiwang Xu, Nanjing (CN); Liang Zhang, Nanjing (CN); Jian Cheng, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 419 days.

(21) Appl. No.: 18/316,591

(22) Filed: May 12, 2023

(65) Prior Publication Data

US 2023/0283624 A1     Sep. 7, 2023

Related U.S. Application Data

(63) Continuation of application No. PCT/CN2021/130427, filed on Nov. 12, 2021.

(30) Foreign Application Priority Data

| Nov. 13, 2020 | (CN) | ......................... 202011271196.X |
| Jan. 30, 2021 | (CN) | ......................... 202110131909.0 |

(51) Int. Cl.
*H04L 9/40* (2022.01)

(52) U.S. Cl.
CPC ...... *H04L 63/1425* (2013.01); *H04L 63/0236* (2013.01); *H04L 63/0263* (2013.01); *H04L 63/20* (2013.01)

(58) Field of Classification Search
CPC ............. H04L 63/1425; H04L 63/0236; H04L 63/0263; H04L 63/20
See application file for complete search history.

(56) References Cited

U.S. PATENT DOCUMENTS

| 2006/0136570 | A1* | 6/2006 | Pandya | ................. G06F 16/951 |
| | | | | 709/217 |
| 2008/0168529 | A1* | 7/2008 | Anderson | ............. G06F 21/577 |
| | | | | 726/1 |

(Continued)

FOREIGN PATENT DOCUMENTS

| CN | 101505218 A | 8/2009 |
| CN | 110392013 A | 10/2019 |

OTHER PUBLICATIONS

Extended European Search Report in European Appln No. 21891227. 7, dated Apr. 29, 2024, 10 pages.

(Continued)

*Primary Examiner* — Cheng-Feng Huang
(74) *Attorney, Agent, or Firm* — Fish & Richardson P.C.

(57)     ABSTRACT

This application provides a method, an apparatus, and a system for determining data flow information. The method includes: obtaining flow parameters of a plurality of data flows within a first time period; obtaining at least one data flow group according to the flow parameters of the plurality of data flows and a flow parameter rule of at least one preset access mode, where a relationship between data flows in each data flow group satisfies a flow parameter rule of one preset access mode; and determining group parameters of each data flow group.

20 Claims, 11 Drawing Sheets

(56)                    References Cited

U.S. PATENT DOCUMENTS

| | | | |
|---|---|---|---|
| 2009/0064332 A1 | 3/2009 | Porras et al. | |
| 2014/0086211 A1* | 3/2014 | Liu ....................... | H04W 36/22 |
| | | | 370/331 |
| 2016/0021135 A1* | 1/2016 | Chesla ................ | H04L 63/1416 |
| | | | 726/23 |
| 2016/0036838 A1 | 2/2016 | Jain et al. | |
| 2017/0078168 A1* | 3/2017 | Harris, Jr. ........... | H04L 63/0263 |
| 2018/0309772 A1* | 10/2018 | Song ..................... | H04L 63/101 |
| 2019/0108342 A1* | 4/2019 | Conikee ................ | G06F 21/577 |
| 2020/0067932 A1 | 2/2020 | Zhang | |
| 2020/0228553 A1 | 7/2020 | Nitz et al. | |
| 2021/0044568 A1* | 2/2021 | Murata ............... | H04L 63/0245 |

OTHER PUBLICATIONS

International Search Report and Written Opinion in International Appln. No. PCT/CN2021/130427, mailed on Jan. 20, 2022, 18 pages (with English translation).

\* cited by examiner

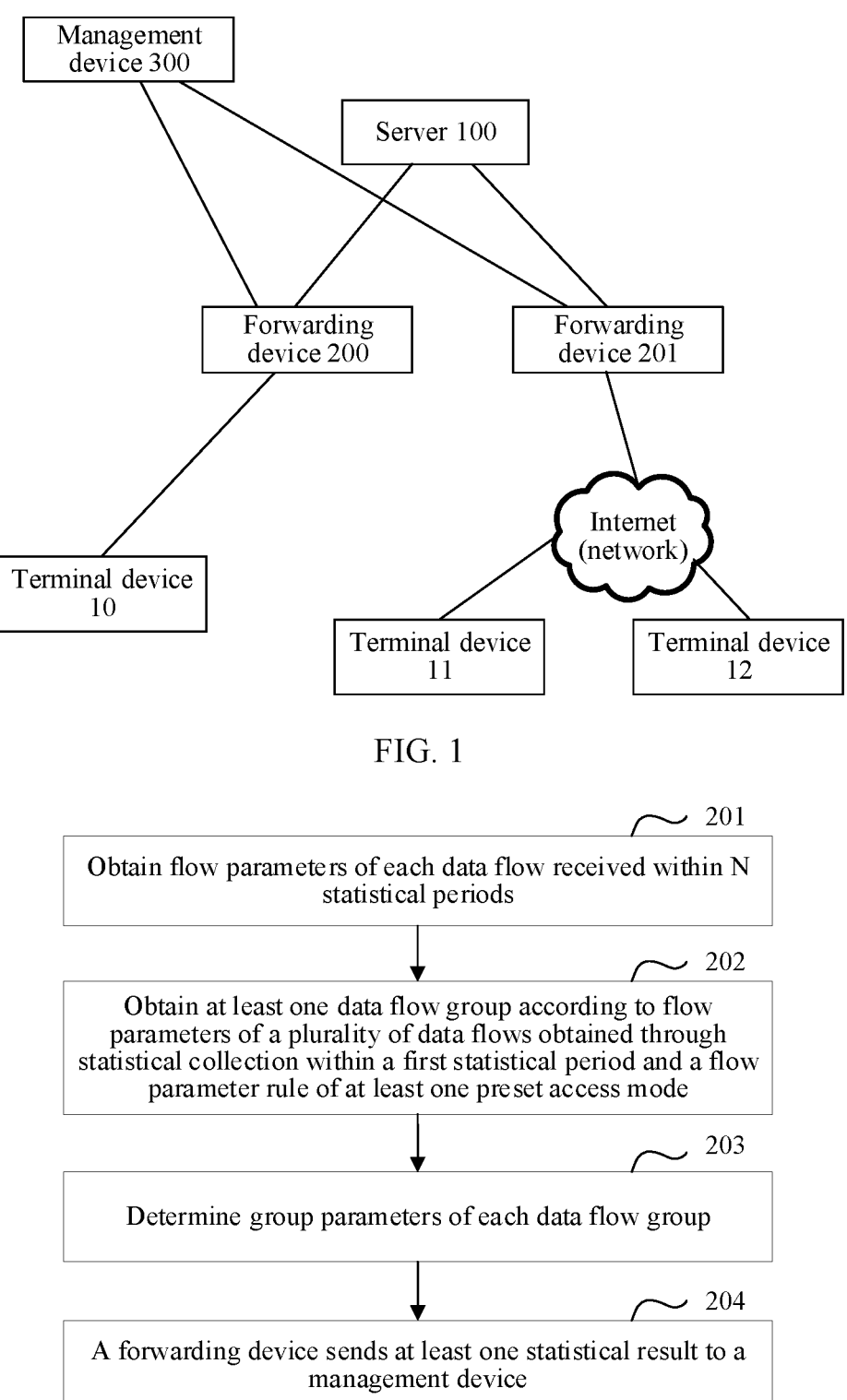

Obtain flow parameters of each data flow received within N
statistical periods

202

Obtain at least one data flow group according to flow
parameters of a plurality of data flows obtained through
statistical collection within a first statistical period and a flow
parameter rule of at least one preset access mode

203

Determine group parameters of each data flow group

204

A forwarding device sends at least one statistical result to a
management device

FIG. 2

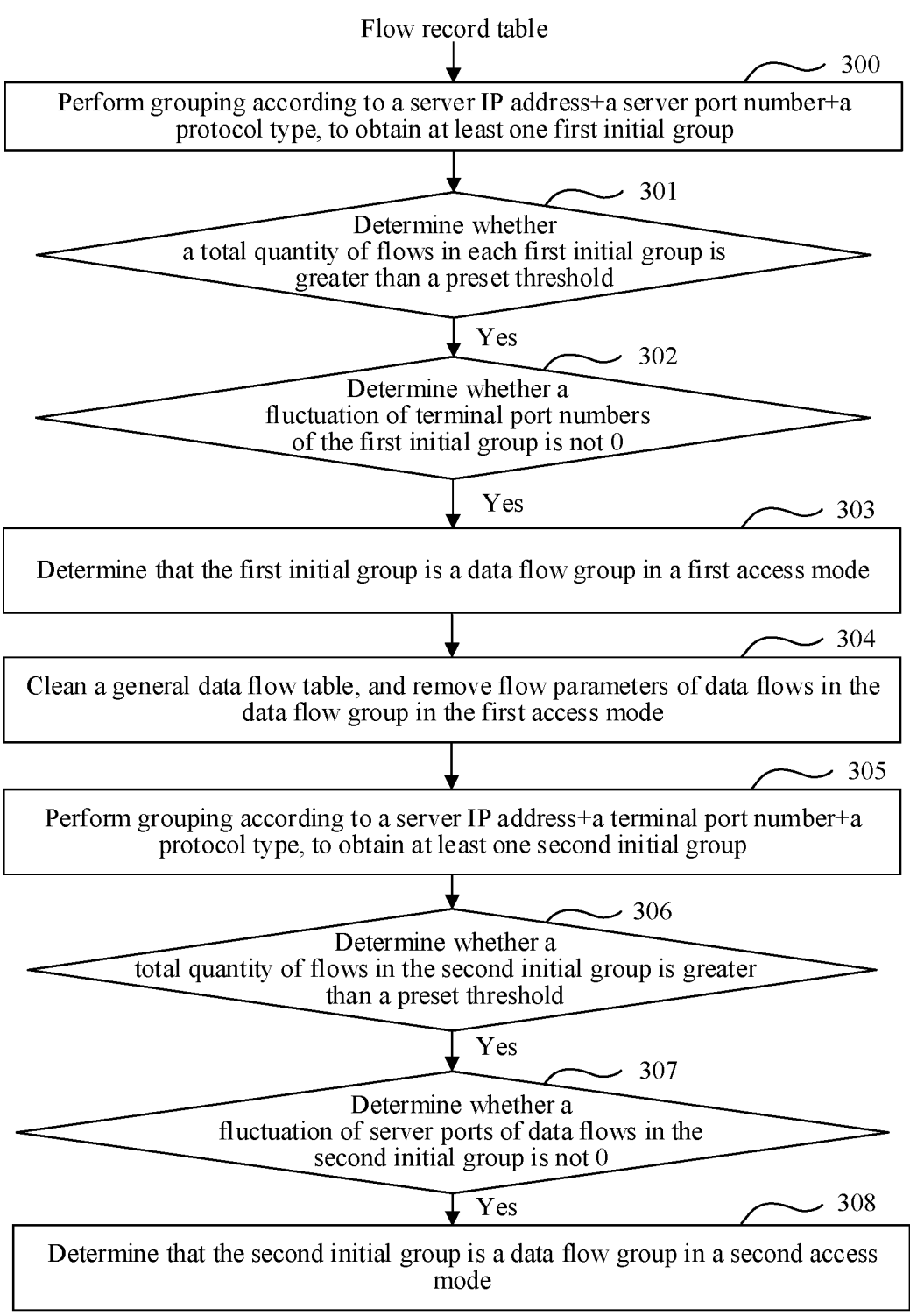

Flow record table

300 — Perform grouping according to a server IP address+a server port number+a protocol type, to obtain at least one first initial group 301 — Determine whether a total quantity of flows in each first initial group is greater than a preset threshold Yes 302 — Determine whether a fluctuation of terminal port numbers of the first initial group is not 0

Yes

303 — Determine that the first initial group is a data flow group in a first access mode 304 — Clean a general data flow table, and remove flow parameters of data flows in the data flow group in the first access mode 305 — Perform grouping according to a server IP address+a terminal port number+a protocol type, to obtain at least one second initial group 306 — Determine whether a total quantity of flows in the second initial group is greater than a preset threshold Yes 307 — Determine whether a fluctuation of server ports of data flows in the second initial group is not 0

Yes

308 — Determine that the second initial group is a data flow group in a second access mode

FIG. 3

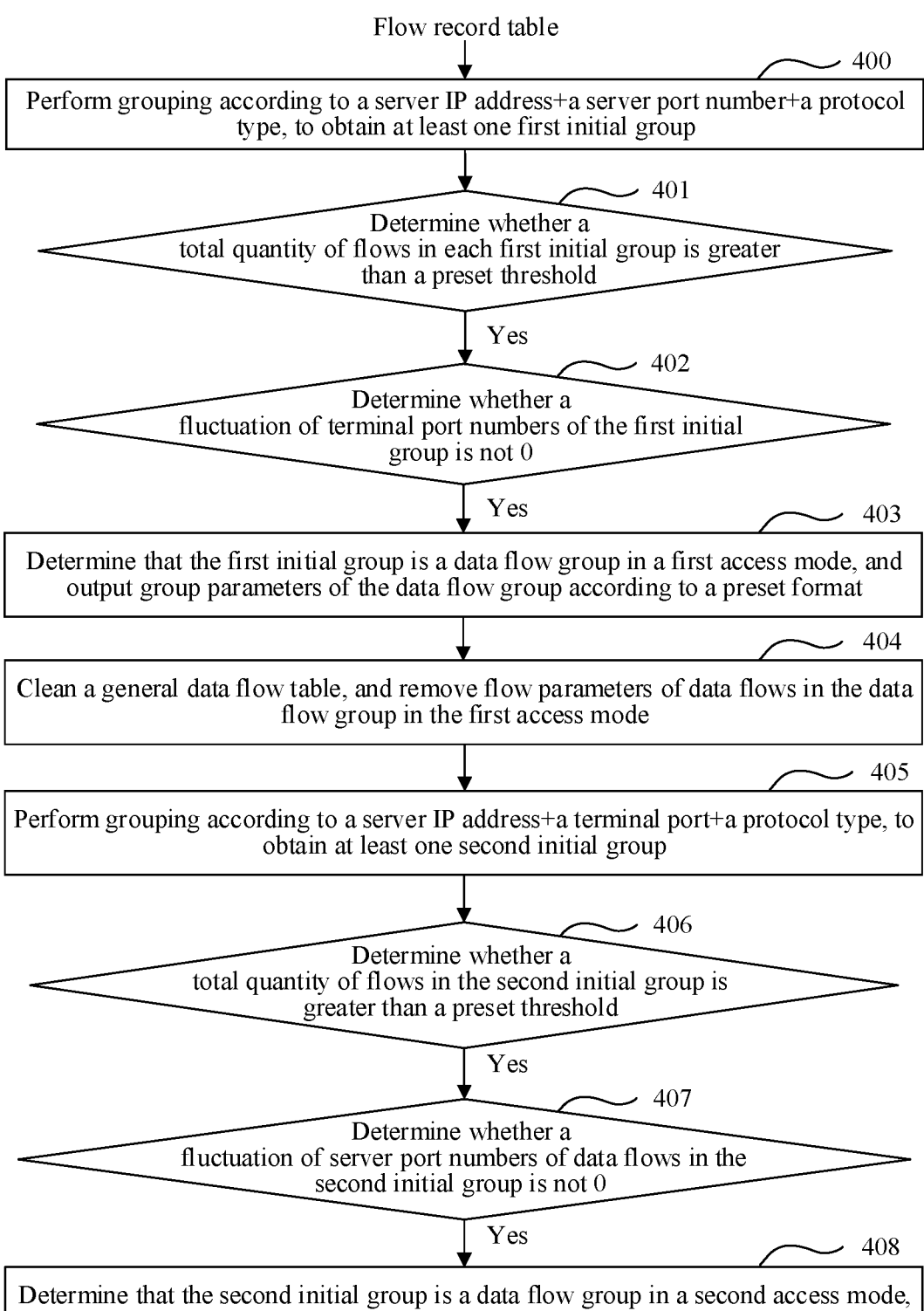

Flow record table

400
Perform grouping according to a server IP address+a server port number+a protocol type, to obtain at least one first initial group

401
Determine whether a total quantity of flows in each first initial group is greater than a preset threshold Yes

402
Determine whether a fluctuation of terminal port numbers of the first initial group is not 0

Yes

403
Determine that the first initial group is a data flow group in a first access mode, and output group parameters of the data flow group according to a preset format

404
Clean a general data flow table, and remove flow parameters of data flows in the data flow group in the first access mode

405
Perform grouping according to a server IP address+a terminal port+a protocol type, to obtain at least one second initial group

406
Determine whether a total quantity of flows in the second initial group is greater than a preset threshold Yes

407
Determine whether a fluctuation of server port numbers of data flows in the second initial group is not 0

Yes

408
Determine that the second initial group is a data flow group in a second access mode, and output group parameters of the data flow group according to a preset format

FIG. 4

A management device receives first group parameter information sent by one or more first devices ~ 601

The management device processes the first group parameter information sent by the one or more first devices ~ 602

The management device determines second group parameter information of each data flow group ~ 603

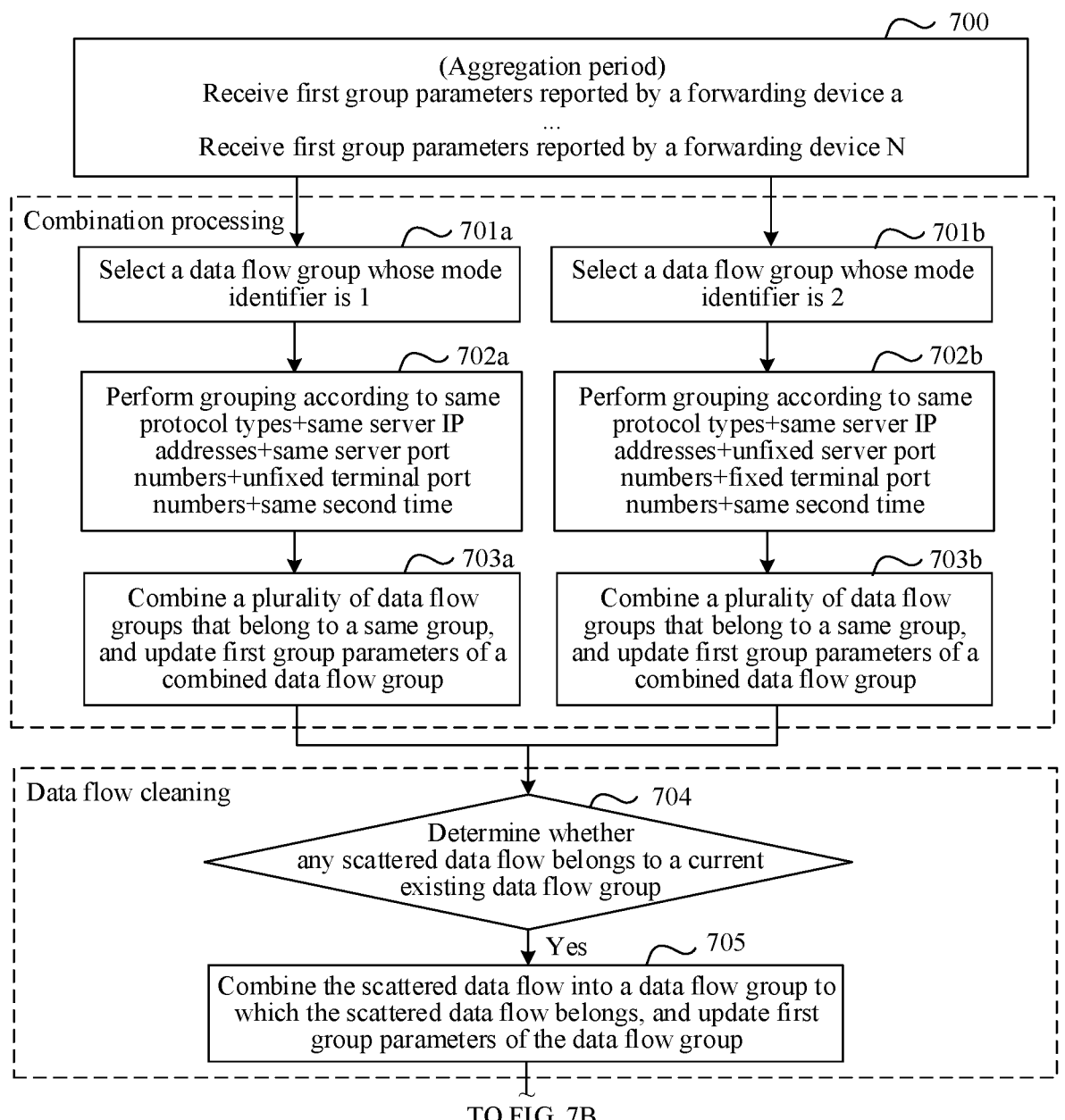

~ 700

(Aggregation period)
Receive first group parameters reported by a forwarding device a
...
Receive first group parameters reported by a forwarding device N Combination processing ~ 701a
Select a data flow group whose mode identifier is 1

~ 701b
Select a data flow group whose mode identifier is 2

~ 702a
Perform grouping according to same protocol types+same server IP addresses+same server port numbers+unfixed terminal port numbers+same second time ~ 702b
Perform grouping according to same protocol types+same server IP addresses+unfixed server port numbers+fixed terminal port numbers+same second time ~ 703a
Combine a plurality of data flow groups that belong to a same group, and update first group parameters of a combined data flow group ~ 703b
Combine a plurality of data flow groups that belong to a same group, and update first group parameters of a combined data flow group Data flow cleaning ~ 704
Determine whether any scattered data flow belongs to a current existing data flow group Yes  ~ 705

Combine the scattered data flow into a data flow group to which the scattered data flow belongs, and update first group parameters of the data flow group

METHOD, APPARATUS, AND SYSTEM FOR DETERMINING DATA FLOW INFORMATION

CROSS-REFERENCE TO RELATED APPLICATIONS

This application is a continuation of International Application No. PCT/CN2021/130427, filed on Nov. 12, 2021, which claims priority to Chinese Patent Application No. 202110131909.0, filed on Jan. 30, 2021, which claims priority to Chinese Patent Application No. 202011271196.X, filed on Nov. 13, 2020. All of the aforementioned applications are hereby incorporated by reference in their entireties.

TECHNICAL FIELD

This application relates to the field of communication technologies, and in particular, to a method, an apparatus, and a system for determining data flow information.

BACKGROUND

As services in communication fields become increasingly diversified and complex, the quantity of terminal devices of different types keeps increasing, which increasingly blurs a trusted boundary of a network. It is difficult to manage these terminal devices in a centralized manner due to a wide distribution range and scattered access locations. Therefore, the terminal devices may be used as springboards for attackers to attack the network for illegal purposes, causing serious economic losses.

Specifically, the terminal device interacts with a server through a data packet, to request a service. Correspondingly, the server sends a data packet to the terminal device to provide a service or send a feedback response. A group of data packets exchanged between the terminal device and the server is collectively referred to as a data flow.

SUMMARY

This application provides a method, an apparatus, and a system for determining data flow information, to mine an access pattern reflected by a data flow actually transmitted in a network.

According to a first aspect, this application provides a method for determining data flow information. The method may be applied to a first device. The first device may be a forwarding device, a device connected to the forwarding device in bypass mode (referred to as a bypass device hereinafter), or a management device. The method is implemented by the first device, and may be specifically implemented by a component of the first device, for example, implemented by a part, for example, a processing apparatus, a circuit, or a chip in the first device. The method includes: The first device obtains flow parameters of a plurality of data flows within a period of time (denoted as a first time period), where the flow parameters include, but are not limited to: a protocol type, a terminal port number, a server IP address, and a server port number; obtains at least one data flow group according to the flow parameters of the plurality of data flows and a flow parameter rule of at least one preset access mode, where one preset access mode corresponds to one group of preset flow parameter rules, and a relationship between data flows included in each data flow group satisfies a preset flow parameter rule; and for a determined data flow group, determines group parameters of the data flow group according to flow parameters of data flows in the data flow group, where the group parameters include, but are not limited to: a server IP address, a server port number range, a terminal port number range, and a protocol type. Specifically, a lower limit of the server port number range in the group parameters is a server port number minimum value in the data flows in the data flow group, and an upper limit of the server port number range is a server port number maximum value in the data flows in the data flow group.

According to the foregoing design, based on a large quantity of data flows actually transmitted in a network, data flows with a same access pattern may be used as one data flow group, and group parameters of each data flow group may be determined. These group parameters may be used in numerous security or monitoring scenarios such as security rule formulation or anomaly detection, to avoid an existing security operation scenario that fully relies on experience, so that information about the actually transmitted data flows can be better used. This can improve reliability and assurance of network security.

In a possible implementation method, the group parameters of the data flow group may identify an abnormal data flow or may be used to determine a security rule, and the security rule is used to control forwarding of a data flow by the forwarding device.

In a possible implementation method, the group parameter may further include, but is not limited to some or all of the following: a terminal IP address set, a quantity of data flows, time mode information, an access mode identifier, a flow support, and a device access support, where the terminal IP address set includes different terminal IP addresses corresponding to the data flows in the data flow group.

(1) The quantity of data flows is a quantity of the data flows included in the data flow group. (2) The time mode information indicates a preset time mode that the data flow group is in, and different preset time modes are in a one-to-one correspondence with preset time ranges. (3) The access mode identifier identifies a preset access mode that the data flow group is in. (4) The flow support is determined based on the quantity of the data flows in the data flow group and a total quantity of the data flows within the first time period. (5) The device access support is determined based on a quantity of terminals corresponding to the data flow group and a total quantity of terminals that is determined based on sample data. The sample data refers to (flow parameters of) all data flows based on which current data flow group mining is performed.

According to the foregoing design, an access behavior of data flows may be mined from a plurality of dimensions, so that accuracy of data flow group mining is improved and applicability is high.

In a possible implementation method, the at least one preset access mode includes one or more of the following modes: a first access mode, a second access mode, and a third access mode. A relationship between data flows in a data flow group in the first access mode satisfies a first flow parameter rule, and the first flow parameter rule includes: for the data flows in the data flow group, protocol types are same, terminal port numbers are not exactly same, server port numbers are same, and server IP addresses are same; or for the data flows in the data flow group, protocol types are same, terminal port numbers are not exactly same, server port numbers are same, and server IP addresses belong to a same preset IP address group. A relationship between data flows in a data flow group in the second access mode satisfies a second flow parameter rule, and the second flow parameter rule includes: for the data flows in the data flow group, protocol types are same, server port numbers are not exactly same, terminal port numbers are same, and server IP addresses are same; or for the data flows in the data flow group, protocol types are same, server port numbers are not exactly same, terminal port numbers are same, and server IP addresses belong to a same preset IP address group. A relationship between data flows in a data flow group in the third access mode satisfies a third flow parameter rule, and the third flow parameter rule includes: for the data flows in the data flow group, protocol types are same, server port numbers are not exactly same, terminal port numbers are not exactly same, and server IP addresses are same; or for the data flows in the data flow group, protocol types are same, server port numbers are not exactly same, terminal port numbers are not exactly same, and server IP addresses belong to a same preset IP address group.

According to the foregoing design, an access behavior between the terminal device and the server can be mined in a more comprehensive and multi-dimensional manner on a server side, a terminal device side, or both the sides, so that subsequent abnormal data flow detection or security rule formulation is facilitated, and applicability is high.

In a possible implementation method, the at least one preset access mode includes the first access mode and the second access mode.

The obtaining at least one data flow group according to a flow parameter rule of at least one preset access mode and the flow parameters of the plurality of data flows includes: determining, according to the flow parameters of the plurality of data flows within the first time period, the data flow group in the first access mode, and determining, according to flow parameters of remaining data flows, the data flow group in the second access mode.

In a possible implementation method, the first device is a management device, and the at least one preset access mode further includes the third access mode. The method further includes: The management device determines the data flow group in the third access mode based on data flows that are in the plurality of data flows within the first time period and that are other than the data flows in the data flow groups in the first access mode and the second access mode.

In a possible implementation method, the first device is the forwarding device or the bypass device of the forwarding device. The method further includes: The first device obtains group parameters of a plurality of data flow groups that are determined within a reporting period, where a length of the reporting period is greater than a length of the first time period; and combines at least two data flow groups in the plurality of data flow groups, and determines group parameters of a combined data flow group according to the group parameters of the at least two data flow groups, where a relationship between data flows in the at least two data flow groups satisfies the first flow parameter rule or the second flow parameter rule.

In a possible implementation method, the method further includes: obtaining scattered data flows within a reporting period, where the scattered data flows are any data flows that do not belong to any data flow group within the reporting period; determining whether a relationship between each scattered data flow and a data flow in a currently existing data flow group satisfies the first flow parameter rule or the second flow parameter rule; and if the relationship between the scattered data flow and the data flow in the currently existing data flow group satisfies the first flow parameter rule or the second flow parameter rule, combining the scattered data flow and the data flow group (or referred to as a target data flow group of the scattered data flow), and updating group parameters of a combined data flow group according to flow parameters of the scattered data flow and group parameters of the target data flow group.

According to the foregoing design, the reporting manner can effectively reduce repeated reporting of redundant information, and reduce resource overheads.

In a possible implementation method, the first device is the forwarding device or the bypass device of the forwarding device. The method further includes: The management device sends group parameters of a data flow group that are determined by the first device.

In a possible implementation method, the first device is the management device, the flow parameters of the plurality of data flows within the first time period are from a plurality of second devices, and the plurality of second devices include a forwarding device and/or a bypass device of the forwarding device.

In a possible implementation method, the first device is a management device, and the management device stores group parameters of historical data flow groups. The method further includes: receiving a query request, where the query request indicates a query condition, and the query condition includes one or more of to-be-queried group parameters; and determining a query result that satisfies the query condition, and sending the query result.

The foregoing design may be applied to abnormal data flow detection, so that an abnormal data flow can be detected in time. This improves efficiency and accuracy of detecting the abnormal data flow.

In a possible implementation method, the to-be-queried group parameters include a flow support and/or a device access support. The query condition further includes a first query threshold and/or a second query threshold, the first query threshold corresponds to the flow support, and the second query threshold corresponds to the device access support.

The query result includes some or all of group parameters of a data flow group in the historical data flow groups that has a flow support satisfying the first query threshold, and/or some or all of group parameters of a data flow group in the historical data flow groups that has a device access support satisfying the second query threshold.

According to the foregoing design, a manner of generating a security rule based on an access behavior of data flows transmitted on a network may be further implemented, to avoid merely relying on manual experience to configure a security rule. This improves reliability of data access in the network.

In a possible implementation method, the forwarding device is a switch, a router, a virtual private network VPN device, or a firewall virtual device.

According to a second aspect, this application provides a method for determining data flow information. The method may be applied to a third device. The method is implemented by the third device, and may be specifically implemented by a component of the third device, for example, implemented by a part, for example, a processing apparatus, a circuit, or a chip in the third device. The method includes: during security rule formulation, obtaining group parameters of a target data flow group, where the group parameters include a server IP address, a server port number range, a terminal port number range, and a protocol type; and determining a security rule according to the group parameters, where the security rule includes a blacklist and/or a whitelist, the blacklist indicates a data flow that needs to be intercepted, and the whitelist indicates a data flow that needs to be forwarded.

According to the foregoing design, a manner of generating a security rule based on an access behavior of data flows transmitted on a network may be further implemented, to avoid merely relying on manual experience to configure a security rule. This improves reliability of data access in the network.

In a possible implementation method, a flow support of the target data flow group is greater than a first threshold or a device access support of the target data flow group is greater than a second threshold, where the group parameters are used to determine the blacklist; or a flow support of the target data flow group is less than a third threshold or a device access support of the target data flow group is less than a fourth threshold, where the group parameters are used to determine the blacklist.

According to a third aspect, this application provides a system for determining data flow information. The system includes at least one first device and at least one management device. The first device may be a forwarding device or a bypass device of the forwarding device. The first device obtains flow parameters of a plurality of data flows within a first time period, and obtains at least one data flow group according to the flow parameters of the plurality of data flows and a flow parameter rule of at least one preset access mode, where the flow parameters include a protocol type, a terminal port number, a server IP address, and a server port number; then determines group parameters of each data flow group, where the group parameters include a server IP address, a server port number range, a terminal port number range, and a protocol type, and each preset access mode corresponds to one group of preset flow parameter rules; and sends a statistical result of the first time period to the management device, where the statistical result includes the determined group parameters of the at least one data flow group. The management device receives a plurality of statistical results, where the plurality of statistical results are from one or more first devices.

In a possible implementation method, the group parameters of the data flow group may identify an abnormal data flow or may be used to determine a security rule, and the security rule is used to control forwarding of a data flow by the forwarding device.

In a possible implementation method, the group parameter may further include, but is not limited to some or all of the following: a terminal IP address set, a quantity of data flows, time mode information, an access mode identifier, a flow support, and a device access support, where the terminal IP address set includes different terminal IP addresses corresponding to the data flows in the data flow group.

(1) The quantity of data flows is a quantity of the data flows included in the data flow group. (2) The time mode information indicates a preset time mode that the data flow group is in, and different preset time modes are in a one-to-one correspondence with preset time ranges. (3) The access mode identifier identifies a preset access mode that the data flow group is in. (4) The flow support is determined based on the quantity of the data flows in the data flow group and a total quantity of the data flows within the first time period. (5) The device access support is determined based on a quantity of terminals corresponding to the data flow group and a total quantity of terminals that is determined based on sample data. The sample data refers to (flow parameters of) all data flows based on which current data flow group mining is performed.

In a possible implementation method, the at least one preset access mode includes one or more of the following modes: a first access mode, a second access mode, and a third access mode. A relationship between data flows in a data flow group in the first access mode satisfies a first flow parameter rule, and the first flow parameter rule includes: for the data flows in the data flow group, protocol types are same, terminal port numbers are not exactly same, server port numbers are same, and server IP addresses are same; or for the data flows in the data flow group, protocol types are same, terminal port numbers are not exactly same, server port numbers are same, and server IP addresses belong to a same preset IP address group. A relationship between data flows in a data flow group in the second access mode satisfies a second flow parameter rule, and the second flow parameter rule includes: for the data flows in the data flow group, protocol types are same, server port numbers are not exactly same, terminal port numbers are same, and server IP addresses are same; or for the data flows in the data flow group, protocol types are same, server port numbers are not exactly same, terminal port numbers are same, and server IP addresses belong to a same preset IP address group. A relationship between data flows in a data flow group in the third access mode satisfies a third flow parameter rule, and the third flow parameter rule includes: for the data flows in the data flow group, protocol types are same, server port numbers are not exactly same, terminal port numbers are not exactly same, and server IP addresses are same; or for the data flows in the data flow group, protocol types are same, server port numbers are not exactly same, terminal port numbers are not exactly same, and server IP addresses belong to a same preset IP address group.

In a possible implementation method, the at least one preset access mode includes the first access mode and the second access mode; and that the first device obtains at least one data flow group according to a flow parameter rule of at least one preset access mode and the flow parameters of the plurality of data flows includes: determining, according to the flow parameters of the plurality of data flows within the first time period, the data flow group in the first access mode, and determining, according to flow parameters of remaining data flows, the data flow group in the second access mode.

In a possible implementation method, that the first device determines a statistical result includes: The first device obtains group parameters of a plurality of data flow groups that are determined within a reporting period, where a length of the reporting period is greater than a length of the first time period; and combines at least two data flow groups in the plurality of data flow groups, and determines group parameters of a combined data flow group according to the group parameters of the at least two data flow groups, where a relationship between data flows in the at least two data flow groups satisfies the first flow parameter rule or the second flow parameter rule.

In a possible implementation method, that the first device determines a statistical result includes: obtaining scattered data flows within a reporting period, where the scattered data flows are data flows that do not belong to any data flow group in the plurality of data flows within the reporting period; determining whether a relationship between each scattered data flow and a data flow in a currently existing data flow group satisfies the first flow parameter rule or the second flow parameter rule; and if the relationship between the scattered data flow and the data flow in the currently existing data flow group satisfies the first flow parameter rule or the second flow parameter rule, combining the scattered data flow and the data flow group (or referred to as a target data flow group of the scattered data flow), and updating group parameters of a combined data flow group according to flow parameters of the scattered data flow and group parameters of the target data flow group.

In a possible implementation method, the statistical result includes group parameters of each uncombined data flow group that are determined within the reporting period, the group parameters of the combined data flow group, and flow parameters of remaining uncombined scattered data flows in the plurality of data flow groups.

In a possible implementation method, the management device obtains a plurality of statistical results within a second time period from the plurality of received statistical results, combines at least two data flow groups in the plurality of statistical results based on the plurality of statistical results within the second time period, and determines group parameters of a combined data flow group according to group parameters of the at least two data flow groups, where a relationship between data flows in the at least two data flow groups satisfies the first flow parameter rule or satisfies the second flow parameter rule.

In a possible implementation method, the at least one preset access mode further includes the third access mode. The statistical result further includes a scattered data flow that is not grouped into any data flow group. The management device adds one or more scattered data flows in the plurality of statistical results within the second time period to the target data flow group, and updates group parameters of the target data flow group according to flow parameters of the scattered data flow, where a relationship between a data flow in the target data flow group and the scattered data flow satisfies the first flow parameter rule or the second flow parameter rule. The management device determines the data flow group in the third access mode based on remaining scattered data flows.

In a possible implementation method, the management device stores group parameters of historical data flow groups. The method further includes: The management device receives a query request, where the query request indicates a query condition, and the query condition includes one or more of to-be-queried group parameters. The management device determines a query result that satisfies the query condition, and sends the query result.

In a possible implementation method, the to-be-queried group parameters include a flow support and/or a device access support. The query condition further includes a first query threshold and/or a second query threshold, the first query threshold corresponds to the flow support, and the second query threshold corresponds to the device access support. The query result includes some or all of group parameters of a data flow group in the historical data flow groups that has a flow support satisfying the first query threshold, and/or some or all of group parameters of a data flow group in the historical data flow groups that has a device access support satisfying the second query threshold.

According to a fourth aspect, this application provides a system for determining data flow information. The system includes at least one first device and at least one management device. The first device may be a forwarding device or a bypass device of the forwarding device. The first device sends flow parameters of a plurality of data flows within a first time period to the management device, where the flow parameters include a protocol type, a terminal port number, a server IP address, and a server port number. The management device receives the flow parameters of the plurality of data flows within the first time period from one or more first devices, and obtains at least one data flow group according to the flow parameters of the plurality of data flows and the flow parameter rule of the at least one preset access mode; and determines group parameters of each data flow group, where the flow parameters include a protocol type, a terminal port number, a server IP address, and a server port number; the group parameters include: a server IP address, a server port number range, a terminal port number range, and a protocol type; and each preset access mode corresponds to one group of preset flow parameter rules.

In a possible implementation method, the group parameters of the data flow group may identify an abnormal data flow or may be used to determine a security rule, and the security rule is used to control forwarding of a data flow by the forwarding device.

In a possible implementation method, the group parameter may further include, but is not limited to some or all of the following: a terminal IP address set, a quantity of data flows, time mode information, an access mode identifier, a flow support, and a device access support, where the terminal IP address set includes different terminal IP addresses corresponding to the data flows in the data flow group.

(1) The quantity of data flows is a quantity of the data flows included in the data flow group. (2) The time mode information indicates a preset time mode that the data flow group is in, and different preset time modes are in a one-to-one correspondence with preset time ranges. (3) The access mode identifier identifies a preset access mode that the data flow group is in. (4) The flow support is determined based on the quantity of the data flows in the data flow group and a total quantity of the data flows within the first time period. (5) The device access support is determined based on a quantity of terminals corresponding to the data flow group and a total quantity of terminals that is determined based on sample data. The sample data refers to (flow parameters of) all data flows based on which current data flow group mining is performed.

In a possible implementation method, the at least one preset access mode includes one or more of the following modes: a first access mode, a second access mode, and a third access mode. A relationship between data flows in a data flow group in the first access mode satisfies a first flow parameter rule, and the first flow parameter rule includes: for the data flows in the data flow group, protocol types are same, terminal port numbers are not exactly same, server port numbers are same, and server IP addresses are same; or for the data flows in the data flow group, protocol types are same, terminal port numbers are not exactly same, server port numbers are same, and server IP addresses belong to a same preset IP address group. A relationship between data flows in a data flow group in the second access mode satisfies a second flow parameter rule, and the second flow parameter rule includes: for the data flows in the data flow group, protocol types are same, server port numbers are not exactly same, terminal port numbers are same, and server IP addresses are same; or for the data flows in the data flow group, protocol types are same, server port numbers are not exactly same, terminal port numbers are same, and server IP addresses belong to a same preset IP address group. A relationship between data flows in a data flow group in the third access mode satisfies a third flow parameter rule, and the third flow parameter rule includes: for the data flows in the data flow group, protocol types are same, server port numbers are not exactly same, terminal port numbers are not exactly same, and server IP addresses are same; or for the data flows in the data flow group, protocol types are same, server port numbers are not exactly same, terminal port numbers are not exactly same, and server IP addresses belong to a same preset IP address group.

In a possible implementation method, the at least one preset access mode includes the first access mode and the second access mode.

The management device determines, according to the flow parameters of the plurality of data flows within the first time period, the data flow group in the first access mode, and determines, based on remaining data flows other than data flows in the data flow group in the first access mode, the data flow group in the second access mode.

The at least one preset access mode further includes the third access mode.

The management device determines the data flow group in the third access mode based on remaining data flows other than the data flows in the data flow groups in the first access mode and the second access mode.

In a possible implementation method, the management device stores group parameters of historical data flow groups. The method further includes: receiving a query request, where the query request indicates a query condition, and the query condition includes one or more of to-be-queried group parameters; and determining a query result that satisfies the query condition, and sending the query result.

In a possible implementation method, the to-be-queried group parameters include a flow support and/or a device access support. The query condition further includes a first query threshold and/or a second query threshold, the first query threshold corresponds to the flow support, and the second query threshold corresponds to the device access support. The query result includes some or all of group parameters of a data flow group in the historical data flow groups that has a flow support satisfying the first query threshold, and/or some or all of group parameters of a data flow group in the historical data flow groups that has a device access support satisfying the second query threshold.

According to a fifth aspect, this application provides a system for determining data flow information. The system includes at least one first device and at least one management device. The first device may be a forwarding device or a bypass device of the forwarding device. The first device sends received data flows to the management device. The management device receives a plurality of data flows, where the plurality of data flows are from one or more first devices; determines flow parameters of each data flow in the plurality of data flows, and obtains at least one data flow group according to a flow parameter rule of at least one preset access mode and the flow parameters of the plurality of data flows; and determines group parameters of each data flow group, where the flow parameters include a protocol type, a terminal port number, a server IP address, and a server port number; the group parameters include: a server IP address, a server port number range, a terminal port number range, and a protocol type; and each preset access mode corresponds to one group of preset flow parameter rules.

In a possible implementation method, the group parameters of the data flow group may identify an abnormal data flow or may be used to determine a security rule, and the security rule is used to control forwarding of a data flow by the forwarding device.

In a possible implementation method, the group parameter may further include, but is not limited to some or all of the following: a terminal IP address set, a quantity of data flows, time mode information, an access mode identifier, a flow support, and a device access support, where the terminal IP address set includes different terminal IP addresses corresponding to the data flows in the data flow group.

(1) The quantity of data flows is a quantity of the data flows included in the data flow group. (2) The time mode information indicates a preset time mode that the data flow group is in, and different preset time modes are in a one-to-one correspondence with preset time ranges. (3) The access mode identifier identifies a preset access mode that the data flow group is in. (4) The flow support is determined based on the quantity of the data flows in the data flow group and a total quantity of the data flows within the first time period. (5) The device access support is determined based on a quantity of terminals corresponding to the data flow group and a total quantity of terminals that is determined based on sample data. The sample data refers to (flow parameters of) all data flows based on which current data flow group mining is performed.

In a possible implementation method, the at least one preset access mode includes one or more of the following modes: a first access mode, a second access mode, and a third access mode. A relationship between data flows in a data flow group in the first access mode satisfies a first flow parameter rule, and the first flow parameter rule includes: for the data flows in the data flow group, protocol types are same, terminal port numbers are not exactly same, server port numbers are same, and server IP addresses are same; or for the data flows in the data flow group, protocol types are same, terminal port numbers are not exactly same, server port numbers are same, and server IP addresses belong to a same preset IP address group. A relationship between data flows in a data flow group in the second access mode satisfies a second flow parameter rule, and the second flow parameter rule includes: for the data flows in the data flow group, protocol types are same, server port numbers are not exactly same, terminal port numbers are same, and server IP addresses are same; or for the data flows in the data flow group, protocol types are same, server port numbers are not exactly same, terminal port numbers are same, and server IP addresses belong to a same preset IP address group. A relationship between data flows in a data flow group in the third access mode satisfies a third flow parameter rule, and the third flow parameter rule includes: for the data flows in the data flow group, protocol types are same, server port numbers are not exactly same, terminal port numbers are not exactly same, and server IP addresses are same; or for the data flows in the data flow group, protocol types are same, server port numbers are not exactly same, terminal port numbers are not exactly same, and server IP addresses belong to a same preset IP address group.

In a possible implementation method, the at least one preset access mode includes the first access mode and the second access mode.

The management device determines, according to the flow parameters of the plurality of data flows within the first time period, the data flow group in the first access mode, and determines, based on remaining data flows other than data flows in the data flow group in the first access mode, the data flow group in the second access mode.

The at least one preset access mode further includes the third access mode.

The management device determines the data flow group in the third access mode based on remaining data flows other than the data flows in the data flow groups in the first access mode and the second access mode.

In a possible implementation method, the management device stores group parameters of historical data flow groups. The method further includes: receiving a query request, where the query request indicates a query condition, and the query condition includes one or more of to-bequeried group parameters; and determining a query result that satisfies the query condition, and sending the query result.

In a possible implementation method, the to-be-queried group parameters include a flow support and/or a device access support; and the query condition further includes a first query threshold and/or a second query threshold, the first query threshold corresponds to the flow support, and the second query threshold corresponds to the device access support; and the query result includes some or all of group parameters of a data flow group in the historical data flow groups that has a flow support satisfying the first query threshold, and/or some or all of group parameters of a data flow group in the historical data flow groups that has a device access support satisfying the second query threshold.

According to a sixth aspect, this application further provides an apparatus for determining data flow information. The apparatus includes a plurality of functional units, and the functional units may perform functions performed in the steps in the method in the first aspect or perform functions performed in the steps in the method in the second aspect. These functional units may be implemented by using hardware, or may be implemented by using software. In a possible design, the apparatus includes an obtaining unit and a processing unit. In another possible design, the apparatus includes an obtaining unit and a determining unit.

According to a seventh aspect, this application further provides an apparatus for determining data flow information. The apparatus includes a processor, a memory, and a transceiver. The memory stores program instructions. The processor runs the program instructions in the memory, and communicates with another device by using the transceiver, to implement the method provided in the first aspect or the method provided in the second aspect.

According to an eighth aspect, this application further provides an apparatus for determining data flow information. The device includes at least one processor and an interface circuit. The processor is configured to communicate with another apparatus by using the interface circuit, to implement the method provided in the first aspect or the method provided in the second aspect.

According to a ninth aspect, this application further provides a computer-readable storage medium. The computer-readable storage medium stores instructions. When the instructions are run on a computer, the computer is enabled to perform the method provided in the first aspect or implement the method provided in the second aspect.

For beneficial effects implemented in the third aspect to the ninth aspect, refer to descriptions of beneficial effects of performing the method by the first device in the first aspect or the second aspect. Details are not described herein again.

BRIEF DESCRIPTION OF DRAWINGS

FIG. 1 is a schematic diagram of a system architecture according to an embodiment of this application;

FIG. 2 is a schematic flowchart corresponding to a method for determining data flow information according to an embodiment of this application;

FIG. 3 is a schematic flowchart of determining a data flow group according to an embodiment of this application;

FIG. 4 is a schematic flowchart of determining data flow information according to an embodiment of this application;

FIG. 7A and FIG. 7B are a schematic flowchart of another method for determining data flow information according to an embodiment of this application;

DESCRIPTION OF EMBODIMENTS

Figures 5, 6:
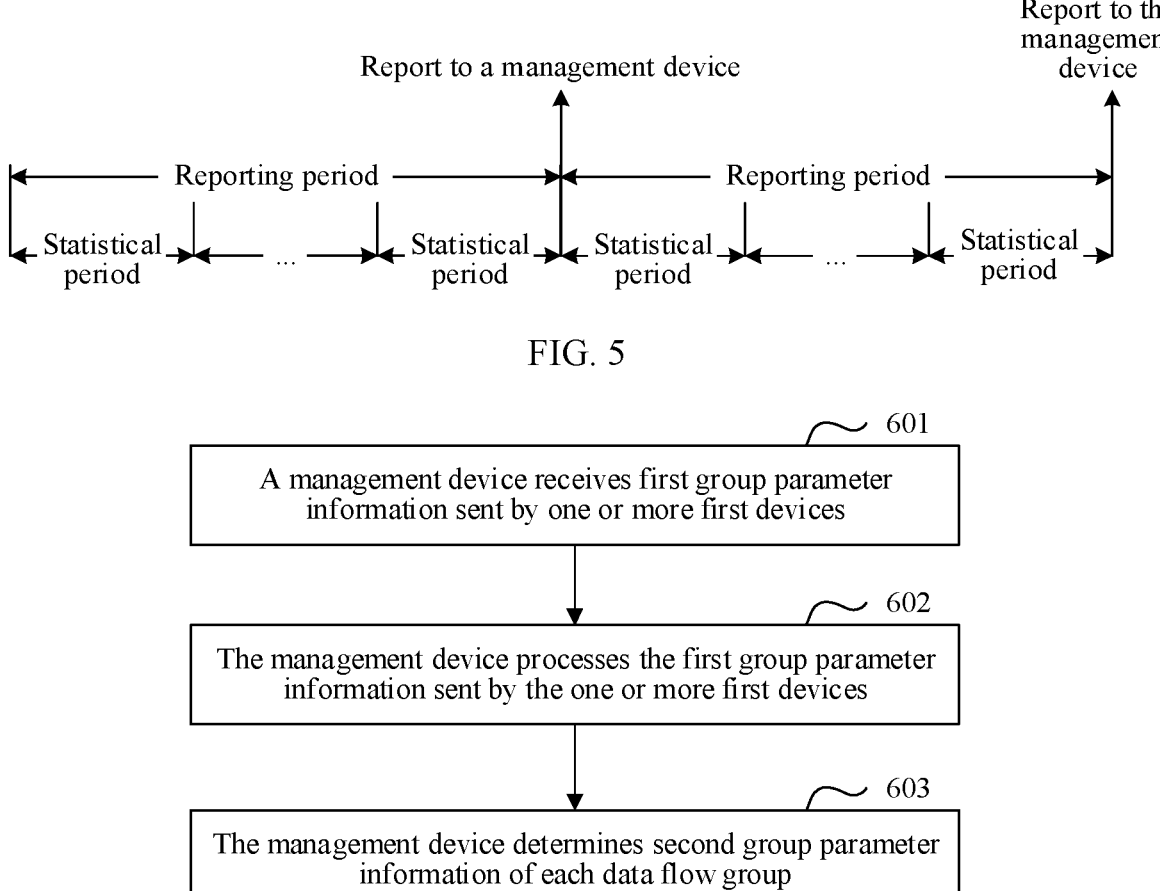
FIG. 5 is a schematic diagram of a relationship between a reporting period and a statistical period according to an embodiment of this application.
FIG. 6 is a schematic flowchart corresponding to another method for determining data flow information according to an embodiment of this application.

To make the objectives, technical solutions, and advantages of this application clearer, the following further describes this application in detail with reference to the accompanying drawings. A specific operation method in a method embodiment may also be applied to an apparatus embodiment or a system embodiment.

FIG. 1 is a schematic diagram of a network architecture to which an embodiment of this application is applicable. The network architecture includes one or more servers (a server 100 is shown as an example in FIG. 1, but this is not limited in this application), one or more forwarding devices (forwarding devices 200 and 201 are shown as an example in FIG. 1, but this is not limited in this application), terminal devices (terminal devices 10, 11, and 12 are shown as an example in FIG. 1, but this is not limited in this application), and one or more management devices 300 (the management device 300 is shown as an example in FIG. 1, but this is not limited in this application).

In the following, some terms of embodiments of this application are described, to help a person skilled in the art have a better understanding. It should be noted that, the explanations and descriptions are intended to facilitate understanding of embodiments of this application, but should not be construed as limiting the protection scope required by embodiments of this application.

1. A terminal device may be a device having a wired or wireless transceiver function. The terminal device may be referred to as a terminal for short. The terminal device may be deployed on land, including an indoor device, an outdoor device, a handheld device, or a vehicle-mounted device; may be deployed on water (for example, on a ship); or may be deployed in the air (for example, on a plane, a balloon, or a satellite). The terminal device may be user equipment (UE). The UE is a handheld device, a vehicle-mounted device, a wearable device, or a computing device that has a wired communication function or a wireless communication function. For example, the UE may be a mobile phone, a tablet computer, or a computer with a wired transceiver function or a wireless transceiver function. The terminal device may alternatively be a virtual reality (VR) terminal device, an augmented reality (AR) terminal device, a wireless terminal in industrial control, a wireless terminal in unmanned driving, a wireless terminal in telemedicine, a wireless terminal in a smart grid, a wireless terminal in a smart city, a wireless terminal in a smart home, and/or the like. For example, the terminal device may alternatively be an internet of things device based on internet protocol (IP) communication, for example, a camera, a printer, an IP phone, an automated teller machine (ATM), a smart counter, a number scheduling machine, or a return counter.

2. A forwarding device, for example, may be a switch, a router, a virtual private network (VPN), or a firewall virtual device, and is mainly configured to forward a data flow. Specifically, the forwarding device may forward or intercept a data flow according to a configured security rule. Security rules configured on different forwarding devices may be different, and the security rules are described below.

3. A server is a device configured to provide one or more services (or functions). The network architecture shown in FIG. 1 may be used in a plurality of scenarios, for example, a financial network, a campus network, and a medical network. For example, in a financial network, the terminal device may be a surveillance camera, and the server may be a server of a surveillance platform. In another example, the terminal device may be an ATM, and the server may be a specific server of a financial institution. For example, a service server in a financial network may be configured to provide a specific service function, for example, a transfer, a deposit, transaction authentication, and a query service.

4. The management device is configured to configure a security rule for the forwarding device and support functions such as user access. In a specific form, the management device usually refers to a control device (which interacts with a device and manages a device). The management device may be an area-level network management device, configured to manage a network device (for example, a forwarding device) in a specified area, or may be a cloud platform. The cloud platform may manage a plurality of area-level network management devices, or certainly may directly manage some or all network devices in a specified area. A security analysis function component may be integrated into the network management device, or may be integrated into the cloud platform, to implement the method for determining data flow information provided in this application. In addition, the management device may be further configured to deliver a security rule. For example, a manner in which the management device delivers the security rule may include: sending, by the cloud platform, the (received) security rule to the network management device, and then delivering, by the network management device, the security rule to the forwarding device.

5. A data flow refers to a group of data packets exchanged between two nodes. Generally, one data flow includes a plurality of data packets. According to a transmission direction of the data packets, the data flow includes an uplink packet and a downlink packet. A data packet sent by the terminal device to the server is referred to as an uplink packet, and a data packet sent by the server to the terminal device is referred to as a downlink packet. For example, a format of the data packet includes a packet header and a data part. The data part is used to carry to-be-transmitted information. The packet header is used to carry 5-tuple information. The 5-tuple information is described below, and details are not described herein again.

The network architecture shown in FIG. 1 is described below.

Refer to FIG. 1. When the server 100 is deployed in an enterprise network, the terminal device may be directly deployed in the enterprise network, for example, in a production network of an enterprise. The terminal device may alternatively be deployed in an external network of the enterprise. This type of terminal device may access the enterprise network in a VPN manner or the like, to communicate with the server 100. Specifically, the terminal device may perform access in a wireless manner, or may perform access in a wired manner. This is not limited in embodiments of this application.

The terminal device interacts with a server through a data packet, to request a service. Correspondingly, the server sends a data packet to the terminal device to provide a service or send a feedback response. As described above, a group of data packets exchanged between the terminal device and the server is referred to as a data flow. Still refer to FIG. 1. A transmission path of the data flow may further include one or more forwarding devices. The forwarding device may be configured to: receive the data flow, parse the data packets in the data flow to obtain 5-tuple information, and then send, according to a destination IP address in the 5-tuple information obtained through parsing, the data flow to a device (such as a server) corresponding to the destination IP address. Specifically, a security rule, for example, a blacklist and/or a whitelist, is set on the forwarding device. The whitelist records information about a data flow of which forwarding is allowed. The blacklist records information about a data flow of which forwarding is not allowed or that needs to be intercepted. The data flow that needs to be intercepted may come from a device that attacks the server or a terminal device in the network architecture shown in FIG. 1. Therefore, after receiving a data flow, the forwarding device is further configured to: extract information, for example, 5-tuple information, of the data flow, and determine, according to the extracted information and the security rule, whether the data flow can be forwarded or needs to be intercepted. For example, after detecting that a data packet belongs to a data flow of which passage is allowed in the security rule, the forwarding device forwards the data packet. If a data packet does not belong to a data flow of which passage is allowed in the security rule, the forwarding device intercepts the packet and cannot forward the packet, to protect the server or the terminal device from illegal attacks.

During actual application, a security rule relies on experience of a security administrator, that is, the security rule is configured by the security administrator according to known viruses or hacker techniques. In addition to a case in which a forwarding device illegally permits traffic due to an incorrect security rule configuration, an unknown threat may fail to be detected, resulting in a major security event.

A person skilled in the art may learn that, in some scenarios, an access behavior during interaction between a terminal device and the server is fixed. For example, a data flow obtained by a surveillance camera is usually sent to a server of a specific surveillance platform. Data flow information actually transmitted in the network has great application value and reference significance. For example, the data flow information may be used for security rule formulation, abnormal data flow identification, among other scenarios. This greatly improves network security. However, no specific solution for determining data flow information is provided in the conventional technology.

In view of this, an embodiment of this application provides a method for determining data flow information. In the method, flow parameters of a plurality of data flows within a first time period may be obtained, a data flow group having a fixed access mode may be mined according to the flow parameters of the data flows, and group parameters of the data flow group may be determined according to the flow parameters of each data flow in the data flow group. In embodiments of this application, access patterns of a large quantity of data flows actually transmitted in a network may be mined, data flows with a same access pattern are used as one data flow group, and group parameters of each data flow group are determined. These group parameters may be used in numerous security scenarios such as security rule formulation or abnormal data flow detection, to avoid an existing security operation scenario that fully relies on experience, so that information about the actually transmitted data flows can be better used. This can improve reliability and assurance of network security.

A method for determining data flow information according to an embodiment of this application is described below in detail. The method may be applied to the network architecture shown in FIG. 1. It should be noted that the network architecture shown in FIG. 1 is merely an example. A network architecture that the method can be applied is not limited in embodiments of this application. During actual application, compared with FIG. 1, more or fewer devices may be deployed in the network architecture. For example, a firewall may be further deployed in a server, that is, data forwarded by a forwarding device to the server needs to be verified by the firewall before being forwarded to the server.

FIG. 2 is a flowchart of a method for determining data flow information according to an embodiment of this application. The method may be performed by the forwarding device (for example, the switch, the router, or the VPN) in FIG. 1, a bypass device of the forwarding device, or the management device. One forwarding device is first used as an example below to describe the method in detail. As shown in FIG. 2, the method may include the following steps.

Step 201: The forwarding device obtains flow parameters of each data flow received within N statistical periods, where N is a positive integer.

The statistical periods may be configured by another device, for example, the management device, for the forwarding device, or may be agreed on by the management device and the forwarding device by using a protocol, or may be determined in another manner. This is not limited in embodiments of this application. The statistical period may be used as a granularity for collecting statistics of data flows. For example, if the statistical period is configured as 30 minutes, the forwarding device may perform the solution of determining data flow information in this application once based on a data flow detected every 30 minutes. In this way, a quantity of data flows collected within one statistical period is neither excessively large nor excessively small, and a calculation burden and a delay caused by an excessive sample data volume are avoided, and an amount of sample data is not excessively small, so that data flow information can be effectively mined, and mining precision can be improved as much as possible. Certainly, the forwarding device may alternatively perform the method for determining data flow information once based on data flows obtained through statistical collection within a plurality of statistical periods. For example, if the statistical period is 30 minutes, the forwarding device may obtain flow parameters of data flows within two statistical periods, that is, 60 minutes, to mine data flow information, or may be understood as directly configuring the statistical period as 60 minutes.

For example, the forwarding device may perform step 201 by default, or may trigger execution of step 201 after receiving a start instruction. For example, the management device or another network device sends a start instruction to the forwarding device. The start instruction indicates the forwarding device to enable a data mining function, to perform step 201. Optionally, the start instruction may further include configuration information about the foregoing statistical period, and the configuration information is used to configure the statistical period for the forwarding device. In this manner, the statistical period configured for the forwarding device may be dynamically adjusted. An adjustment method is flexible, and no high signaling overheads are caused. If the start instruction does not include the configuration information of the statistical period, the forwarding device may perform step 201 based on a previously configured statistical period, a statistical period agreed in a protocol, or a statistical period determined in another manner.

Optionally, the start instruction may further include a quantity of valid times or a valid time. The valid quantity of times or the valid time indicates a valid quantity of times or a valid time for the statistical period to be valid. Subsequently, the forwarding device may execute, within a valid statistical period, the solution for determining data flow information in this application. After the valid quantity of times or the valid time is reached, the forwarding device disables a data mining function, so that the forwarding device is in a more energy-saving state. For example, the valid quantity of times is 3, that is, three statistical periods are valid. The three valid statistical periods may be three statistical periods after the start instruction is received. In another manner of disabling the data mining function, another device such as a management device may send an end instruction to indicate the forwarding device to disable the data mining function.

In addition, one forwarding device is used as an example to describe the statistical period. It should be noted that different statistical periods may be configured on different forwarding devices in a network architecture. For example, in FIG. 2, a statistical period configured on the forwarding device 200 may be 20 minutes, and a statistical period configured on the forwarding device 201 may be 30 minutes. In addition, the foregoing values of the statistical period are merely examples. The content is not limited in this application.

One statistical period is used as an example below to describe an implementation process of step 201 in detail. For ease of description, the statistical period is referred to as a first statistical period.

The forwarding device receives a plurality of data flows within the first statistical period, and determines the flow parameters of each received data flow.

The flow parameters of the data flow may include 5-tuple information and first time information. The first time information may be time at which the forwarding device receives the data flow or a period identifier of a statistical period within which the forwarding device receives the data flow. For example, the period identifier may be represented by any moment within the statistical period. For example, if the first statistical period is 2020.10.01 15:00-2020.10.01 15:30, the period identifier corresponding to the first statistical period may be 2020.10.01 15:00. In another example, the period identifier may be a number of the statistical period. For example, numbers start from 1, that is, a number of the first statistical period is 1, and then numbers of all statistical periods are sequentially incremented by 1 in a time sequence, that is, numbers of statistical periods recorded by the forwarding device are 1, 2, . . . , n, where n is a positive integer. For example, if the number of the statistical period 2020.10.01 15:00-2020.10.01 15:30 is 1 and the length of the statistical period is 30, a number of 2020.10.01 15:30-2020.10.01 16:00 is 2, a number of 2020.10.01 16:00-2020.10.01 16:30 is 3, and so on. For example, similar to 5-tuple information, the first time information may alternatively be determined by parsing a packet. For example, when the first time information is time at which a terminal device or a server sends a data flow, the first time information may be carried in a packet of the data flow. In another example, the first time information may alternatively be determined by the forwarding device. For example, the first time information is time at which the forwarding device receives a data flow, or a period identifier of a statistical period. In addition, the first time information is merely an example. The first time information may alternatively be determined in another manner. For example, the first time information may be time that is determined by the forwarding device and at which the terminal device or the server sends a data flow. This is not limited in embodiments of this application.

The 5-tuple information is described below.

A data flow is uniquely identified by a group of 5-tuple information. Specifically, the 5-tuple information includes (sip, sport, dip, dport, protocol). sip (source ip) identifies a source IP address, sport (source port) identifies a source port number, dip (destination ip) identifies a destination IP address, dport (destination port) identifies a destination port number, and protocol (protocol) identifies a protocol type. One data flow includes an uplink packet and/or a downlink packet. A plurality of data items included in an uplink packet and a downlink packet of a same data flow are same but are arranged in different sequences. For example, a given terminal IP address is clientIP (client IP), a terminal port number is clientPort (client port number), a server IP address is serverIP (server IP), a server port number is serverPort (server port number), and a protocol type is a transmission control protocol (TCP). If a data packet from a terminal to a server is an uplink packet, 5-tuple information corresponding to the uplink packet is (clientIP, clientPort, serverIP, serverPort, TCP). A value of sip is clientIP, a value of sport is clientPort, a value of dip is serverIP, a value of dport is serverPort, and a value of protocol is TCP. If a data packet from the server to the terminal is a downlink packet. 5-tuple information corresponding to the downlink packet is (serverIP, serverPort, clientIP, clientPort, TCP). A value of sip is serverIP, a value of sport is serverPort, a value of dip is clientIP, a value of dport is clientPort, and a value of protocol is TCP. The foregoing protocol type is merely an example, or may be a user datagram protocol (UDP). This is not limited in embodiments of this application.

Specifically, within the first statistical period, each time receiving a data flow, the forwarding device may parse a data packet of the data flow to obtain 5-tuple information of the data flow, and determine and record flow parameters of the data flow. Table 1 shows an example of the flow parameters of the data flow that are recorded by the forwarding device within the first statistical period.

TABLE 1

| First time information | Terminal IP address | Terminal port number | Server IP address | Server port number | Protocol type |
|---|---|---|---|---|---|
| 2020 Sep. 9 15:00 | 192.168.1.100 | 45527 | 10.1.0.100 | 80 | TCP |
| 2020 Sep. 9 15:00 | 192.168.1.101 | 45528 | 10.1.0.100 | 80 | TCP |
| 2020 Sep. 9 15:00 | 192.168.1.102 | 45529 | 10.1.0.100 | 80 | TCP |
| 2020 Sep. 9 15:00 | 192.168.1.100 | 45523 | 10.1.0.101 | 90 | TCP |
| 2020 Sep. 9 15:00 | 192.168.1.101 | 45523 | 10.1.0.101 | 90 | TCP |
| 2020 Sep. 9 15:00 | 192.168.1.103 | 45524 | 10.1.0.101 | 90 | TCP |
| 2020 Sep. 9 15:00 | 192.168.1.102 | 55555 | 10.1.0.101 | 8080 | TCP |
| 2020 Sep. 9 15:00 | 192.168.1.103 | 55555 | 10.1.0.101 | 8081 | TCP |
| 2020 Sep. 9 15:00 | 192.168.1.102 | 45556 | 10.1.0.102 | 45530 | UDP |
| 2020 Sep. 9 15:00 | 192.168.1.103 | 45559 | 10.1.0.102 | 45531 | UDP |

For ease of description, an object (for example, Table 1) used to record flow parameters is referred to as a flow record table below. It should be noted that a form shown in Table 1 is merely an example. A form of recording flow parameters of a data flow is not limited in embodiments of this application. For example, the forwarding device may alternatively record sip, sport, dip, dport, and protocol of a data flow. In other words, entries of the flow record table include sip, sport, dip, dport, and protocol, and do not directly reflect the server and the terminal device. For this type of flow record table, it should be noted that, as described above, because a source address and a destination address in an uplink packet and a downlink packet in a same data flow are interchanged, a source port number and a destination port number are also interchanged. Therefore, to facilitate subsequent data flow information mining, the forwarding device may collect statistics of 5-tuple information of a data flow according to a same rule, for example, collect statistics according to that sip is a terminal IP address, sport is a terminal port number, dip is a server IP address, and dport is a server port number in the flow record table. Based on this, if the first data packet of a data flow A received by the forwarding device is an uplink packet, the forwarding device directly records sip in the uplink packet into sip, records sport into sport, records dip into dip, and records dport into dport. Subsequently, other packets (downlink packets and/or uplink packets) in the same data flow A may be ignored, that is, repeated recording is not required for the same data flow. If the first data packet of a data flow B received by the forwarding device is a downlink packet, because sip in the downlink packet is a server IP address, sport is a server port number, dip is a terminal IP address, and dport is a terminal port number. When flow parameters of the data flow are recorded according to the downlink packet, in the downlink packet, the terminal IP address (dip) may be recorded into sip of the flow record table, the terminal port number (dport) may be recorded into sport of the flow record table, the server IP address (sip) may be recorded into dip of the flow record table, and the server port number (sport) may be recorded into dport of the flow record table.

It should be noted that, data flows obtained through statistical collection in embodiments of this application may be all data flows received by the forwarding device, and whether a data flow needs to be forwarded or intercepted does not need to be distinguished. In other words, the flow record table may collect statistics of a data flow that needs to be intercepted. Because an access pattern of a data flow that needs to be intercepted also has application value or reference value, this is not limited in embodiments of this application.

Step 202: The forwarding device obtains at least one data flow group according to the flow parameters of the data flows obtained through statistical collection within the first statistical period and a flow parameter rule of one or more preset access modes.

Specifically, one preset access mode corresponds to one preset flow parameter rule. For example, the preset access mode includes one or more of a first access mode, a second access mode, and a third access mode. It should be understood that the three access modes are merely examples, and a type and a quantity of preset access modes are not limited in embodiments of this application. The three access modes are described below in detail.

1. First Access Mode

The preset flow parameter rule corresponding to the first access mode is denoted as a first flow parameter rule below. A relationship between data flows in one data flow group in the first access mode satisfies a first flow parameter rule. Specifically, the first flow parameter rule includes: for data flows in a same data flow group, protocol types are same, terminal port numbers are not fixed, server IP addresses are fixed, and server port numbers are fixed. "Fixed" may be understood as unchanged, identical, or unfluctuating. For example, if a server IP address of a data flow 1 is 10.1.0.100, a server IP address of a data flow 2 is 10.1.0.100, and a server IP address of a data flow 3 is 10.1.0.100, it may be considered that the server IP addresses of the data flow 1, the data flow 2, and the data flow 3 are fixed (same). "Unfixed" may be understood as that values fluctuate, are entirely different, or are not exactly same. For example, if a terminal IP address of the data flow 1 is 192.168.1.100, a terminal IP address of the data flow 2 is 192.168.1.101, and a terminal IP address of the data flow 3 is 192.168.1.102, it may be considered that the terminal IP addresses of the data flow 1, the data flow 2, and the data flow 3 are not fixed. Alternatively, the first flow parameter rule includes: for data flows in a data flow group, protocol types are same, terminal IP address is not fixed, terminal port numbers are not fixed, and server IP addresses belong to a same preset IP address group. For example, servers that provide a same service or function are set as a group. In other words, when initiating a service invocation request, the terminal device may access any server in the group of servers, and different server IP addresses in the group of servers form the IP address group. Therefore, if for a plurality of data flows, protocol types are same, terminal IP addresses are not fixed, terminal port numbers are not fixed, and server IP addresses are different but belong to a same group of server IP addresses, it may be considered that a first data flow rule is satisfied. Certainly, a plurality of preset IP address groups may be provided. This is not limited in this application. Similarities are not described again in the following.

In addition, during grouping, a priority of a same preset IP address group is higher than that of a separate IP address. In other words, for a data flow whose server IP address belongs to a preset IP address group, no data flow group is separately generated. For example, the preset IP address group includes 10.0.1.10 and 10.0.1.11. In current statistical collection, flow parameters of a data flow 11 include: a server IP address is 10.0.1.10, a server port number is 80, a terminal port number is 45530, and a protocol type is TCP. Flow parameters of a data flow 12 include: a server IP address is 10.0.1.11, a server port number is 80, a terminal port number is 45531, and a protocol type is TCP. Flow parameters of a data flow 13 include: a server IP address is 10.0.1.11, a server port number is 80, a terminal port number is 45532, and a protocol type is TCP. In this case, the data flow 11, the data flow 12, and the data flow 13 satisfy the first flow parameter rule, and belong to a same data flow group, and no data flow group is separately generated for the data flow 1 and the data flow 2. Certainly, if a data flow obtained through statistical collection includes only one IP address in the preset IP address group, for example, only the data flow 1 and the data flow 2 are obtained through statistical collection, the data flow 1 and the data flow 2 belong to one data flow group. Similarities are not described again below.

2. Second Access Mode

The preset flow parameter rule corresponding to the second access mode is denoted as a second flow parameter rule below. A relationship between data flows in one data flow group in the second access mode satisfies a first flow parameter rule. Specifically, the second flow parameter rule includes: for data flows in a data flow group, protocol types are same, terminal port numbers are fixed, server IP addresses are fixed, and server port numbers are not fixed; or for data flows in a data flow group, protocol types are same, terminal port numbers are fixed, server IP addresses belong to a same preset IP address group, and server port numbers are not fixed.

3. Third Access Mode

The preset flow parameter rule corresponding to the third access mode is denoted as a third flow parameter rule below. A relationship between data flows in one data flow group in the third access mode satisfies a third flow parameter rule. Specifically, the third flow parameter rule includes: for data flows in a data flow group, protocol types are same, terminal port numbers are not fixed, server IP addresses are fixed, and server port numbers are not fixed; or for data flows in a data flow group, protocol types are same, terminal port numbers are not fixed, server IP addresses belong to a same preset IP address group, and server port numbers are not fixed.

For ease of description below, an example in which the server IP addresses in each flow parameter rule are fixed is used for description. It should be understood that, within a same statistical period, a plurality of data flow groups that are independent of each other may exist in a same access mode. The plurality of data flow groups are in a same access mode, but relationships between all data flows included in the plurality of data flow groups do not satisfy a same flow parameter rule. For example, both a data flow group 1 and a data flow group 2 belong to a first access mode. For data flows in the data flow group 1, server IP addresses are all 10.0.1.1, server port numbers are all 80, protocol types are all TCP, and terminal port numbers are not fixed. For data flows in the data flow group 2, server IP addresses are all 10.0.1.2, server port numbers are all 90, protocol types are all TCP, and terminal port numbers are not fixed.

For example, if the preset access mode includes the first access mode, the second access mode, and the third access mode, a data flow group in the first access mode may be first mined according to flow parameters of a plurality of data flows that are obtained through statistical collection within the first statistical period. Next, a data flow group in the second access mode may continue to be mined according to flow parameters of remaining data flows. If an execution device is a management device, a data flow group in the third access mode may continue to be mined based on any remaining data flow that is not grouped into a current data flow group. Details are described below. If an execution device is a forwarding device, the data flow group in the third access mode may not be mined, or in other words, the preset access mode on the forwarding device does not include the third access mode.

Next, for example, the preset access mode includes the first access mode and the second access mode. A process in which the forwarding device groups, according to the two preset access modes, the data flows within the first statistical period to obtain a data flow group is described below in detail.

FIG. 3 is a schematic diagram of a process of mining (determining) a data flow group by a forwarding device. The process includes the following steps.

Step 300: Group data flows based on a general flow record table and according to a first flow parameter rule corresponding to a first access mode. Specifically, data flows are grouped according to a server IP address+a server port number+a protocol type, to obtain at least one initial group. For data flows in each initial group, server IP addresses are same, server port numbers are same, and protocol types are same.

The general flow record table may be understood as a record table used to record flow parameters of all data flows within the first statistical period, for example, Table 1. It should be understood that, if the forwarding device performs data flow group mining once based on data flows collected within a plurality of statistical periods, the general flow record table is a record table of flow parameters of all data flows collected within the plurality of statistical periods.

When the initial group is determined, in an optional implementation, one data flow may be grouped as one initial group. In other words, during grouping in step 300, a quantity of data flows in the initial group may not be limited. Table 2 shows an initial group determined according to the foregoing grouping conditions (server IP address+server port number+protocol type) based on Table 1.

initial group including one flow in the initial groups is cleaned. It should be noted that if the preset threshold is 1, and the grouping conditions further include a condition that one initial group includes at least two data flows, step 301 may not be performed. If the grouping conditions do not limit a quantity of data flows in the initial group, step 301 is performed. It should be noted that it is merely an example that the preset threshold is 1. A value of the preset threshold is not limited in embodiments of this application. For example, the preset threshold may be any positive integer, for example, 10 or 20. It means that when a quantity of data flows in an initial group is small, an access mode to which the initial group belongs may not be determined. In this manner, an amount of computation of an execution body can be reduced while accuracy of an access behavior reflected by data flow mining is improved.

Step 302: Determine whether terminal port numbers of the data flows in the initial group are not fixed; and if the terminal port numbers of the data flows in the initial group are not fixed, determine that the initial group is a data flow group in the first access mode (refer to step 303).

For example, whether the terminal port numbers are not fixed may be determined by determining whether values of the terminal port numbers fluctuate, or whether a fluctuation of values of the terminal port numbers of the data flows in the initial group is 0. If the fluctuation of the values of the terminal port numbers is not 0, the values of the terminal port numbers fluctuate, or the terminal port numbers are not fixed.

In addition, as described above, a plurality of data flow groups may exist for a same access mode. Therefore, it should be understood that step 301 and step 302 may be steps that are performed cyclically. For example, with reference to Table 2, step 301 and step 302 may be first performed for the group 1, and then step 301 and step 302 are performed for the group 2, and so on, until determining of all initial groups is completed (that is, step 302). If the

TABLE 2

| Initial group | First time information | Terminal IP address | Terminal port number | Server IP address | Server port number | Protocol type |
|---|---|---|---|---|---|---|
| Group 1 | 2020/9/5 15:00 | 192.168.1.100 | 45527 | 10.1.0.100 | 80 | TCP |
| | | 192.168.1.101 | 45528 | | | |
| | | 192.168.1.102 | 45529 | | | |
| Group 2 | 2020/9/5 15:00 | 192.168.1.100 | 45523 | 10.1.0.101 | 90 | TCP |
| | | 192.168.1.101 | 45523 | | | |
| | | 192.168.1.103 | 45524 | | | |
| Group 3 | 2020/9/5 15:00 | 192.168.1.102 | 55555 | 10.1.0.101 | 8080 | TCP |
| Group 4 | 2020/9/5 15:00 | 192.168.1.103 | 55555 | 10.1.0.101 | 8081 | TCP |
| Group 5 | 2020/9/5 15:00 | 192.168.1.102 | 45556 | 10.1.0.102 | 45530 | UDP |

In another optional implementation, in step 300, for the grouping conditions, based on the foregoing enumerated conditions, a condition that each initial group includes at least two data flows may be added, to determine an initial group. In this way, a single data flow cannot be used as one initial group.

Step 301: For any initial group, determine whether a total quantity of flows in the initial group is greater than a preset threshold, and perform step 302 if the total quantity of flows in the initial group is greater than the preset threshold.

For example, the preset threshold may be 1. It should be understood that with one data flow, a flow parameter rule that the data flow satisfies cannot be determined. Therefore, initial groups may be filtered according to step 301, and an terminal port numbers of the data flows in the initial group are not fixed, it indicates that the data flows in the initial group satisfy the first flow parameter rule, and the initial group is a data flow group in the first access mode. If the terminal port numbers of the data flows in the initial group are fixed, it is determined that the initial group is not in the first access mode. When all initial groups are executed, step 304 continues to be performed. It should be understood that for determined initial groups that are not in the first access mode, data flows in these initial groups continue to participate in a subsequent data flow group mining procedure.

Step 304: Clean the general flow record table, and remove flow parameters of data flows in the data flow group in the first access mode.

For example, in this example, the flow parameters of the data flows in the data flow group in the first access mode in Table 1 are removed, to obtain flow parameters of remaining data flows.

Step 305: Group data flows according to the flow parameters of the remaining data flows and a second flow parameter rule corresponding to a second access mode. Specifically, data flows are grouped according to a server IP address+a terminal port number+a protocol type to obtain at least one initial group.

For a specific execution step of step 305, refer to related descriptions of step 300. Details are not described herein again. It should be understood that a difference between step 305 and step 300 lies in that grouping conditions of the two steps are different. It should be noted that the initial group determined in step 305 is different from the initial group determined in step 300. For ease of differentiation, the initial group determined in step 300 may be referred to as a first initial group, and the initial group determined in step 305 may be referred to as a second initial group.

Step 306: For any second initial group, determine whether a total quantity of flows in the second initial group is greater than a preset threshold, and perform step 307 if the total quantity of flows in the second initial group is greater than the preset threshold.

It should be noted that step 306 is an optional step. If the grouping conditions further include a condition that one second initial group includes at least two data flows in step 305, step 306 may not be performed. If the grouping conditions do not limit a quantity of data flows in the second initial group, step 306 is performed.

Step 307: Determine whether server port numbers of the data flow in the second initial group are not fixed; and if the server port numbers of the data flows in the second initial group are not fixed, determine that the second initial group is a data flow group in the second access mode (refer to step 308).

FIG. 3 is a schematic of data flow groups obtained by mining the flow parameters of the data flows shown in Table 1 based on the method shown in FIG. 3.

may not include an index of the data flow group, and the group parameters may be stored by using the index of the data flow group.

Step 203: For any data flow group, the forwarding device determines group parameters of the data flow group.

For example, the group parameters include, but are not limited to: a protocol type, a server IP address, a server port number range, and a terminal port number range. Optionally, based on the foregoing, the group parameters may further include, but are not limited to, some or all of the following: a terminal IP address set, second time information (or referred to as time mode information), a quantity of flows, an access mode identifier, a quantity of terminals, a flow support, and a device access support.

Some group parameters are respectively described below.
1. Server Port Number Range/Terminal Port Number Range A server port number range in group parameters of a data flow group is determined according to flow parameters of data flows in the data flow group. Specifically, a lower limit of the server port number range is a server port number minimum value in the data flows in the data flow group. Correspondingly, an upper limit of the server port number range is a server port number maximum value in the data flows in the data flow group.

Similarly, a terminal port number range in group parameters of a data flow group is determined according to flow parameters of data flows in the data flow group. Specifically, a lower limit of the terminal port number range is a terminal port number minimum value in the data flows in the same data flow group. Correspondingly, an upper limit of the terminal port number range is a terminal port number maximum value in the data flows in the data flow group.

It should be noted that in some data flow groups, for example, a data flow group in the first access mode (that is, server port numbers are fixed), a server port number minimum value is the same as a server port number maximum value. For example, a data flow group in the second access mode (that is, terminal port numbers are fixed), a terminal port number minimum value is the same as a terminal port number maximum value.

TABLE 3

| Data flow group | First time information | Terminal IP address | Terminal port number | Server IP address | Server port number | Protocol type |
|---|---|---|---|---|---|---|
| Data flow group 1 | 2020/9/5 15:00 | 192.168.1.100 | 45527 | 10.1.0.100 | 80 | TCP |
| | | 192.168.1.101 | 45528 | | | |
| | | 192.168.1.102 | 45529 | | | |
| Data flow group 2 | 2020/9/5 15:00 | 192.168.1.100 | 45523 | 10.1.0.101 | 90 | TCP |
| | | 192.168.1.101 | 45523 | | | |
| | | 192.168.1.103 | 45524 | | | |
| Data flow group 3 | 2020/9/5 15:00 | 192.168.1.102 | 55555 | 10.1.0.101 | 8080 | TCP |
| | | 192.168.1.103 | | | 8081 | |
| | 2020/9/5 15:00 | 192.168.1.102 | 45556 | 10.1.0.102 | 45530 | UDP |
| | 2020/9/5 15:00 | 192.168.1.103 | 45559 | 10.1.0.102 | 45531 | UDP |

The two data flows displayed in the last two rows in Table 3 do not belong to any current data flow group. In the following, a data flow that is currently not grouped into any data flow group is referred to as a scattered data flow, and one or more scattered data flows form a set of scattered data flows. In addition, it should be noted that, the data flow group in Table 3 is an optional column, and is merely used to describe a data flow group to which the data flows in Table 1 belong. During actual application, the group parameters of the data flow group determined by the forwarding device 2. Terminal IP Address Set The terminal IP address set includes all different terminal IP addresses corresponding to data flows in the data flow group, for example, 192.168.1.100, 192.168.1.102, and 192.168.1.103. To simplify the description, the symbol "-" is used to indicate consecutive IP addresses. For example, the foregoing example may be represented as 192.168.1.100, 192.168.1.102-103 or represented as 192.18.1.100|102|103. It should be understood that a same terminal IP address in a same data flow group is recorded only once, that is, the terminal IP address set is obtained after all IP addresses corresponding to the data flows in the data flow group are deduplicated.

3. Quantity of Terminals

The quantity of terminals is related to a terminal IP address set, and may be a quantity of different IP addresses included in the terminal IP address set, that is, a quantity of terminals having different IP addresses in the data flow group. For example, if the terminal IP address set includes 192.168.1.10011021103, the quantity of terminals is 3.

4. Second Time Information

The second time information indicates time information corresponding to a statistical period. The second time information may be first time information of the data flow group, or may be used to indicate a preset time range to which the data flow group belongs, or a preset time range to which the first statistical period belongs. Specifically, a preset time period to which the data flow group belongs may be determined based on the first time information of the data flow group.

For example, two preset time ranges are configured according to a working time timetable, for example, including a preset time range 1 (8:00-17:30) and a preset time range 2 (17:30-8:00 of the next day). The preset time range 1 is used to represent a working time, and the preset time range 2 is used to represent a non-working time. The second time information may be an identifier corresponding to the preset time range. For example, an identifier of the preset time range 1 is 1, and an identifier of the preset time range 2 is 2. If the first statistical period is 2020.10.01 15:00-2020.10.01 15:30 (that is, the first time information), the first statistical period belongs to the preset time range 1. Correspondingly, the second time information is 1. In this way, the appropriateness of occurrence of a data flow can be better distinguished. If a terminal accesses, in a non-working time, a server that provides a service only in a working time, the access may be an illegal access. This helps to mine a feature of a data flow of a normal access and/or a feature of a data flow of an abnormal access.

Certainly, the configured preset time range is merely an example, and this is not limited in embodiments of this application. For example, time ranges with a finer granularity may be obtained through division. For example, preset time ranges include 0:00-6:00, 6:00-12:00, 12:00-18:00, and 18:00-24:00. Correspondingly, identifiers corresponding to the four time ranges may be 1, 2, 3, and 4. It should be noted that the preset time ranges and the identifiers corresponding to the preset time ranges are merely examples. The identifiers may alternatively be represented in another manner, for example, represented by one or more of a digit, a letter, and a symbol. This is not limited in embodiments of this application. It should be noted that the preset time range does not distinguish between dates, and only focuses on time, that is, same time periods on different dates belong to a same preset time range.

It should be understood that, for ease of differentiation, the time information in the flow parameters of the data flows is denoted as the first time information, and the time information in the group parameters is denoted as the second time information. Various numbers such as "first" and "second" in this application are merely used for differentiation for ease of description, and are not used to limit the scope of embodiments of this application or a sequence. For ease of description below, an example in which the identifiers of the second time information include 1 and 2 described above is used for description.

5. Quantity of Flows

The quantity of flows indicates a quantity of data flows included in the data flow group. For example, in Table 2, a quantity of flows in a data flow group in the first access mode is 3, and a quantity of flows in a data flow group in the second access mode and a quantity of flows in a data flow group in the third access mode are respectively 2.

6. Access Mode Identifier

The access mode identifier is an identifier of a preset access mode, and indicates a preset access mode that the data flow group is in. For example, the access mode identifiers of the first access mode, the second access mode, and the third access mode in the foregoing may be 1, 2, and 3 respectively. Certainly, any identifier in embodiments of this application may alternatively be represented in another manner, for example, represented by one or more of a digit, a letter, and a symbol. This is not limited in embodiments of this application.

In an implementation, the group parameters determined by the forwarding device or the bypass device of the forwarding device do not include the flow support and the device access support. The two parameters are described below in detail.

Specifically, in step 203, for any data flow group, the forwarding device determines group parameters of the data flow group, and records the group parameters according to a preset format.

For example, it is assumed that the group parameters of each data flow group determined by the forwarding device include: a protocol type, a server IP address, a server port number range, a terminal port number range, a terminal IP address set, second time information, a quantity of flows, and an access mode identifier. For example, the preset format of the group parameters of the data flow group may be: [server IP, server port number, terminal port number, port number minimum value, port number maximum value, protocol type, quantity of flows, terminal IP address set, second time information, access mode identifier].

Table 4 shows group parameters that are of the data flow groups in the preset format and that are obtained based on Table 3.

TABLE 4

| Data flow group | Server IP address | Server port number | Terminal port number | Port number minimum value | Port number maximum value | Protocol type | Quantity of flows | Terminal IP address set | Second time information | Access mode identifier |
|---|---|---|---|---|---|---|---|---|---|---|
| 1 | 10.10.1.100 | 80 | −1 | 45527 | 45529 | TCP | 3 | 192.168.1.100|101|102 | 1 | 1 |
| 2 | 10.1.0.101 | 90 | −1 | 45523 | 45524 | TCP | 3 | 192.168.1.100|101|103 | 1 | 1 |
| 3 | 10.1.0.101 | −1 | 55555 | 8080 | 8081 | TCP | 2 | 192.168.1.102|103 | 1 | 2 |
|  | 10.1.0.102 | 45530 | 45556 | −1 | −1 | UDP | 1 | 192.168.1.102 | 1 | −1 |
|  | 10.1.1.103 | 45531 | 45559 | −1 | −1 | UDP | 1 | 192.168.1.102 | 1 | −1 |

The port number minimum value and the port number maximum value may be used to indicate a server port number range, or may be used to indicate a terminal port number range. When the values indicate the server port number range, a separate server port number may be represented by −1. When the values indicate the terminal port number range, a separate terminal port number may be represented by −1. −1 represents an invalid value. For example, as shown in Table 4, if the terminal port number of the data flow group 1 is −1, it indicates that the terminal port numbers of the data flow group are not fixed, a terminal port number minimum value is 45527, and a terminal port number maximum value is 45529. If the server port number of the data flow group 3 is −1, it indicates that server port numbers of the data flow group are not fixed, a server port number minimum value is 8080, and a server port number maximum value is 8081. The access mode identifier being −1 indicates a scattered data flow.

It should be noted that the preset format for recording group parameters is merely an example, and the format is not limited in embodiments of this application. Any manner in which the group parameters can be recorded is applicable to embodiments of this application.

For step 202 and step 203, in an implementation, after some or all of the data flow groups are determined, group parameters of the data flow groups are determined one by one. In another possible implementation, step 202 and step 203 may be combined into one step, that is, the forwarding device determines the group parameters of the data flow group in step 202 when determining the data flow group. For example, FIG. 4 is a schematic flowchart of another data mining method. Similarities between the steps shown in FIG. 4 and the steps in FIG. 3 are not described again. Only differences are described below. Step 403: Determine that the first initial group is a data flow group in the first access mode, and record the group parameters of the data flow group according to the preset format. Step 408: Determine that the second initial group is a data flow group in the second access mode, and record the group parameters of the data flow group according to the preset format.

For ease of description, it is assumed that the granularity of data flow information mining performed by the forwarding device is one statistical period, that is, the forwarding device performs mining according to the flow parameters of the data flows within one statistical period each time to obtain a statistical result of the statistical period, that is, one statistical period corresponds to one statistical result. The statistical result may include group parameters of a data flow group determined by flow parameters of a plurality of data flows within at least one statistical period, or include group parameters of a data flow group that are determined according to flow parameters of a plurality of data flows within at least one statistical period and determined flow parameters of scattered data flows.

Step 204: The forwarding device sends at least one statistical result to the management device, and correspondingly, the management device receives the at least one statistical result sent by the forwarding device.

For example, still refer to Table 4. The forwarding device may report the group parameters of each data flow group shown in Table 4 to the management device. For a scattered data flow, for example, the forwarding device may directly report the flow parameters of the scattered data flow. In another example, the forwarding device may align reporting formats of the group parameters of the data flow group, generate "group parameters" of the scattered data flow according to the preset format of the group parameters, and report the "group parameters" of the scattered data flow. Refer to Table 4. It should be understood that the "group parameters" of the scattered data flow are only used to represent reporting information that is generated according to a preset format of the group parameters and the flow parameters of the scattered data flow and that is used to report the flow parameters of the scattered data flow to the management device, and does not represent that the scattered data flow is a data flow group. For ease of description, the reporting information is referred to as the group parameters of the scattered data flow below. Certainly, if the forwarding device does not need to report a statistical result to the management device, or does not need to report the flow parameters of the scattered data flow to the management device, the forwarding device may not process the flow parameters of the scattered data flow. It is assumed hereinafter that the statistical result includes the group parameters of the scattered data flow.

After determining the group parameters of the data flow group, the forwarding device may report the group parameters to the management device. Subsequently, the group parameters are used to determine a security rule.

In an implementation, the forwarding device may directly report a statistical result of each statistical period to the management device. To be specific, after step 203 is performed, the forwarding device may immediately report, to the management device, group parameters of at least one data flow group determined in step 203 and the group parameters of the scattered data flows without waiting. This reduces a delay for the group parameters to reach the management device.

In another possible implementation, the forwarding device may perform reporting to the management device based on a configured reporting period. That is, the forwarding device may cyclically perform step 201 to step 203 a plurality of times within the reporting period, and each execution is performed for a different statistical period. It should be understood that one statistical result may be obtained by performing step 201 to step 203 each time. FIG. 5 is a schematic diagram of a scenario in which reporting is performed based on a reporting period. For example, the forwarding device may report a plurality of statistical results obtained within the reporting period together. For example, if the reporting period includes m statistical periods and the m statistical periods correspond to m statistical results, the forwarding device may report the m statistical results together. In another example, before reporting, the forwarding device may further process the m statistical results. For example, a processing manner of the m statistical results is described below in detail.

For example, a same data flow group in a plurality of data flow groups that are in the first access mode and that are in the m statistical results is determined. The same data flow group means that a relationship between data flows included in at least two data flow groups satisfies the first flow parameter rule, and the at least two data flow groups are combined. For example, a data flow group in which protocol types are TCP, server IP addresses are 10.0.0.1, server port numbers are 80, and terminal port numbers are not fixed may exist within both a statistical period 1 and a statistical period 2. In this case, a relationship between data flows in the two data flow groups actually satisfies a same first flow parameter rule, and the two data flow groups belong to a same data flow group. It should be understood that some items in group parameters of the same data flow group may be different, for example, quantities of data flows and terminal IP address

TABLE 6

| Data flow group | Server IP address | Server port number | Terminal port number | Port number minimum value | Port number maximum value | Protocol type | Quantity of flows | Terminal IP address set | Second time information | Access mode identifier |
|---|---|---|---|---|---|---|---|---|---|---|
| 1a | 10.10.1.100 | 80 | −1 | 45520 | 45529 | TCP | 7 | 192.168.1.100\|101\|102\|103 | 1 | 1 |
| 2a | 10.1.0.101 | −1 | 55555 | 8080 | 8081 | TCP | 5 | 192.168.1.102\|103 | 1 | 2 |
| 2 | 10.1.0.101 | 90 | −1 | 45523 | 45524 | TCP | 3 | 192.168.1.100\|101\|103 | 1 | 1 |
| | 10.1.1.102 | 45530 | 45556 | −1 | −1 | UDP | 1 | 192.168.1.102 | 1 | −1 |
| | 10.1.1.103 | 45531 | 45559 | −1 | −1 | UDP | 1 | 192.168.1.102 | 1 | −1 |
| | 10.1.0.102 | 45530 | 7060 | −1 | −1 | UDP | 1 | 192.168.1.103 | 1 | −1 |
| | 10.1.1.103 | 80 | 8090 | −1 | −1 | UDP | 1 | 192.168.1.103 | 1 | −1 |
| | 10.1.0.101 | 90 | 45559 | −1 | −1 | TCP | 1 | 192.168.1.102 | 1 | −1 |

The forwarding device may not process scattered data flows. Subsequently, for the reporting period, the forwarding device only needs to report the groups of parameters shown in Table 6. The reporting manner can effectively reduce repeated reporting of redundant information, and reduce resource overheads.

The method for determining data flow information provided in this application is specifically described above by using an example in which the forwarding device is used as an execution device. It should be noted that the execution device in the method may be another device. For example, the another device may be a bypass device, for example, a network probe, of the forwarding device. The network probe configured to listen to a network data packet is referred to as an internet probe. Network data packets can be captured, filtered, and analyzed on the network probe.

An operation procedure in which a network probe is used as an execution body to perform a method for determining data flow information in this application is briefly described below, and includes: After receiving a data packet, the forwarding device performs two operations including an operation 1 and an operation 2 in parallel. In the operation 1, the forwarding device normally forwards the data packet, that is, determines, according to a security rule, whether to forward or intercept the data packet, forwards the packet if forwarding is allowed, or intercepts the packet if forwarding is not allowed. In the operation 2, the forwarding device copies the data packet to obtain a copy of the data packet, and mirrors (in other words, forwards) the copy of the data packet to the network probe by using a specific port number (called a mirror port number) on the forwarding device. Subsequently, the network probe determines and records flow parameters of data flows according to the received packet, and performs subsequent operations such as data flow group mining and group parameter determining. For other procedures, refer to the operation steps performed by the forwarding device in the method for determining data flow information shown in FIG. 2. Details are not described herein again. In this manner, a requirement on a hardware resource of the forwarding device is low, and a hardware resource of the forwarding device in a current network does not need to be improved. The technical solution of this application can be implemented without changing software and/or hardware resources of the current forwarding device and without affecting a normal service such as forwarding of a data flow performed by the forwarding device. This is more conducive to promotion and deployment of the technical solution in an existing network, and achieves high practicability.

It should be noted that the group parameters determined by the forwarding device are merely an example. It should be understood that group parameters configured on different devices may be different. For example, the group parameters determined by the forwarding device are group parameters shown in Table 4, and the group parameters determined by the management device may have more or fewer data items than those in Table 4. For example, the group parameters determined by the management device may further include a flow support and/or a device access support. In addition, the management device may receive group parameters reported by one or more forwarding devices. For example, refer to FIG. 1. The management device 300 may receive group parameters reported by both the forwarding device 200 and the forwarding device 201, and the management device 300 may perform processing again according to these group parameters, to mine an access pattern of data flows in the global network shown in FIG. 1.

For example, the management device is used as an example below to describe a procedure in which the management device performs a method for determining data flow information in embodiments of this application.

FIG. 6 is a schematic flowchart of another method for determining data flow information according to an embodiment of this application. The method may be performed by the management device in FIG. 1. As shown in FIG. 6, the method may include the following steps.

Step 601: The management device receives first group parameters sent by one or more first devices.

For ease of differentiation, group parameters received by the management device are referred to as the first group parameters. Group parameters determined by the management device are referred to as second group parameters below. For example, for the first group parameters, refer to related descriptions of the group parameters determined by the forwarding device in step 204 in FIG. 2 above. Details are not described herein again.

Based on the network architecture shown in FIG. 1, the management device may be a network management device integrating a security analysis function component or a cloud platform integrating a security analysis function component. Correspondingly, the first device may be a forwarding device, or may be a bypass device of the forwarding device. The forwarding device is used as an example. The forwarding device may send the first group parameters determined in one reporting period to a network management device or a cloud platform that integrates a security analysis function component. That is, the network management device or the cloud platform may receive the first group parameters reported by one or more forwarding devices.

Step 602: The management device processes the first group parameters sent by the one or more first devices.

For example, the management device may perform step 602 according to a configured aggregation period. For example, the reporting period of the forwarding device is one hour, and the aggregation period of the management device may be four hours, one week, one month, or the like. It is assumed that the aggregation period is one week. The management device may store first group parameters that are reported by all forwarding devices and that are received within one week. When the aggregation period is reached, the management device may perform combination processing and/or data flow group mining according to a plurality of first group parameters reported by a plurality of forwarding devices.

It should be noted that, lengths of statistical periods and reporting periods of different forwarding devices or bypass devices may be different, but second time information configured on different forwarding devices, bypass devices, and management devices may be same. For example, identifiers of second time information on different devices are 1 and 2, identifiers 1 all indicate 8:00-17:00, and identifiers 2 all indicate 17:00 to 8:00 of the next day. Before performing combination processing and/or data flow group mining, the management device may group the plurality of first group parameters according to the second time information of the data flow groups, and use a plurality of first group parameters with same second time information as one group. It may also be understood that, that the second time information is the same means that occurrence periods of data flows of the plurality of data flow groups are within a same preset time range, for example, all occur within 8:00-17:00. Subsequently, processing such as combination is performed on first group parameters used as a same group. For example, the second time information is divided into 1 and 2 according to a working time and a non-working time. In this case, the first group parameters of all data flow groups within the working time (that is, the second time information is 1) may be used as one group. This helps to analyze an access pattern of data flows within the working time. Similarly, first group parameters of all data flows within the non-working time are used as one group, to analyze an access pattern of the data flows within the non-working time.

Subsequently, the management device performs processing according to the first group parameters of the plurality of data flow groups that have the same second time information, for example, combines first group parameters of same data flow groups. Different from the forwarding device, the management device further processes scattered data flows, and mines, based on the scattered data flows, data flow groups in the third access mode. A method for processing the plurality of first group parameters within the aggregation period by the management device is described below.

In a first processing manner, combination processing is performed first, then data flow cleaning is performed, and finally data flow group mining is performed.

The foregoing three processes are separately described below in detail.

(1) Combination processing: Similarly, the combination processing means that the management device groups, according to a plurality of first group parameters within the aggregation period (the second time information is the same), a plurality of data flow groups in the first access mode, uses a plurality of data flow groups whose data flows satisfy a same first flow parameter rule as one group, subsequently combines a plurality of data flow groups that belong to a same group, and updates first group parameters of a combined data flow group. Similarly, a manner of combining the plurality of data flow groups in the second access mode is the same. For details, refer to the foregoing method procedure in which the forwarding device combines a plurality of statistical results within a statistical period. Details are not described herein again.

(2) Data flow cleaning: Scattered data flows in original samples (that is, a plurality of first group parameters with same second time information within the aggregation period) in combination processing in (1) are cleaned, and scattered data flows that belong to the data flow groups in the current first access mode or scattered data flows that belong to the data flow groups in the second access mode are cleaned.

For example, still with reference to the foregoing example, it is assumed that the first group parameters within the aggregation period include Table 6. Existing data flow groups that are determined according to Table 6 and that are in the first access mode or the second access mode include: a data flow group 1a, a data flow group 2, and a data flow group 2a. It is determined whether a scattered data flow that belongs to the data flow group 1a, the data flow group 2, or the data flow group 2a exists in the scattered data flows in Table 6. If a scattered data flow that belongs to the data flow group 1a, the data flow group 2, or the data flow group 2a exists, the scattered data flow is combined into a data flow group corresponding to the scattered data flow, and a first group parameter record of the scattered data flow is cleaned. A manner of determining whether a scattered data flow belongs to a data flow group may be: determining whether the scattered data flow satisfies a flow parameter rule corresponding to the data flow group. For example, the data flow group 1a is in the first access mode, a flow parameter rule corresponding to the data flow group 1a is that server IP addresses are fixed to 10.10.1.100, server port numbers are fixed to 80, protocol types are TCP, and terminal port numbers are not fixed. For a scattered data flow, if server IP addresses are 10.10.1.100, server port numbers are 80, and protocol types are TCP, it is determined that the scattered data flow belongs to the data flow group 1a. Refer to related descriptions of determining whether a plurality of data flow groups belong to a same data flow group in the foregoing combination processing. Details are not described herein again.

Specifically, data flow cleaning is performed with reference to Table 6. The scattered data flow shown in the last row in Table 6 satisfies a flow parameter rule of the data flow group 2. The scattered data flow is combined into the data flow group 2. Group parameters of the data flow group 2 are updated according to the first group parameters of the scattered data flow, and a record of the scattered data flow is cleaned. It should be understood that the updated group parameter may not change. Table 7 shows a group parameter of a cleaned data flow group.

TABLE 7

| Data flow group | Server IP address | Server port number | Terminal port number | Port number minimum value | Port number maximum value | Protocol type | Quantity of flows | Terminal IP address set | Second time information | Access mode identifier |
|---|---|---|---|---|---|---|---|---|---|---|
| 1a | 10.10.1.100 | 80 | −1 | 45520 | 45529 | TCP | 7 | 192.168.1.100\|101\|102\| 103 | 1 | 1 |
| 2a | 10.1.0.101 | −1 | 55555 | 8080 | 8081 | TCP | 5 | 192.168.1.102\|103 | 1 | 2 |
| 2 | 10.1.0.101 | 90 | −1 | 45523 | 45559 | TCP | 4 | 192.168.1.100\|101\|102\| 103 | 1 | 1 |
| a | 10.1.1.102 | 45530 | 45556 | −1 | −1 | UDP | 1 | 192.168.1.102 | 1 | −1 |
| b | 10.1.1.103 | 45531 | 45559 | −1 | −1 | UDP | 1 | 192.168.1.102 | 1 | −1 |
| c | 10.1.0.102 | 45530 | 7060 | −1 | −1 | UDP | 1 | 192.168.1.103 | 1 | −1 |
| e | 10.1.1.103 | 80 | 8090 | −1 | −1 | UDP | 1 | 192.168.1.103 | 1 | −1 |

It should be understood that Table 6 is merely an example. If the aggregation period includes a plurality of first group parameters with same second time information, each scattered data flow needs to be compared with a flow parameter rule of each data flow group indicated in the plurality of first group parameters, to determine whether the scattered data flow can be combined into a current data flow group.

Figure 7B:
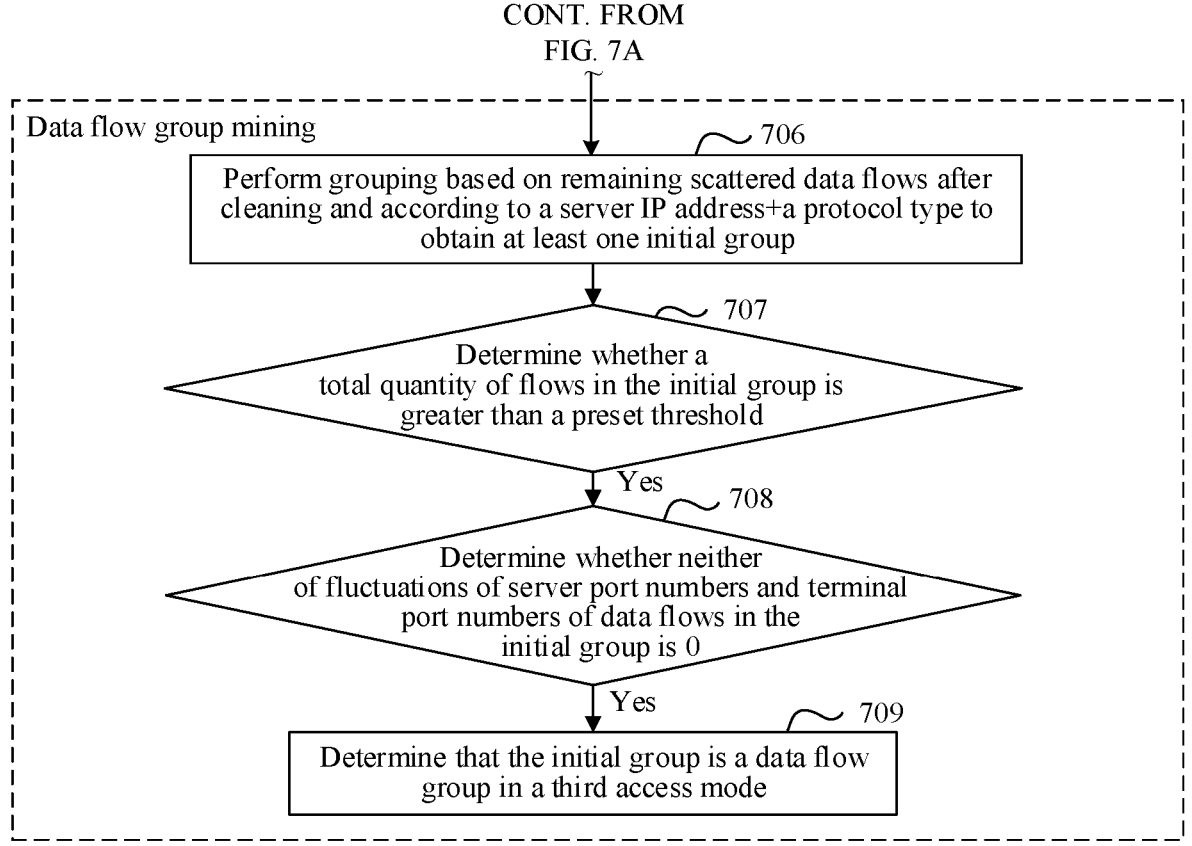

(3) Data flow group mining: After cleaning, a data flow group in the first access mode or the second access mode or a data flow group in the third access mode may further exist in the remaining scattered data flows. Therefore, a process of data flow group mining includes: Data mining is performed again based on the remaining scattered data flows after the original samples are cleaned. A new data flow group in the first access mode may be mined, or a new data flow group in the second access mode may be mined. First group parameters of the new data flow groups are separately determined. After the new data flow group in the first access mode and the new data flow group in the second access mode are sequentially mined, a data flow group in the third access mode continues to be mined based on the remaining scattered data flows other than data flows in the new data flow groups. Specifically, FIG. 7A and FIG. 7B show a complete procedure of the foregoing processing method. A process of mining data flow groups in the first access mode and the second access mode in FIG. 7A and FIG. 7B is similar to a related procedure in FIG. 3 or FIG. 4. Details are not described herein again. The procedure includes the following steps.

Step 700: Receive a plurality of first group parameters reported by a forwarding device a to a forwarding device n within an aggregation period.

Step 701a: Select a data flow group whose mode identifier is 1 from the plurality of first group parameters.

Step 702a: Perform grouping according to same protocol types+same server IP addresses+same server port numbers+unfixed terminal port numbers+same second time information.

Step 703a: Combine a plurality of data flow groups that belong to a same group, and update first group parameters of a combined data flow group.

Step 701b: Select a data flow group whose mode identifier is 2 from the plurality of first group parameters.

Step 702b: Perform grouping according to same protocol types+same server IP addresses+unfixed server port numbers+fixed terminal port numbers+same second time information.

Step 703b: Combine a plurality of data flow groups that belong to a same group, and update first group parameters of a combined data flow group.

Step 704: Determine whether any scattered data flow belongs to a current existing data flow group.

Step 705: Combine the scattered data flow into a data flow group to which the scattered data flow belongs, and update first group parameters of the data flow group according to first group parameters of the scattered data flow.

Step 706: Perform grouping according to a server IP address+a protocol type to obtain at least one initial group.

Step 707: Determine whether a quantity of the initial groups is greater than a preset threshold, and if the quantity of the initial groups is greater than the preset threshold, perform step 707.

Step 708: Determine whether server port numbers of data flows in the initial group are not fixed and whether terminal port numbers are not fixed, and if the server port numbers of the data flows in the initial group are not fixed and the terminal port numbers are not fixed, determine that the initial group is a data flow group in the third access mode (refer to step 709).

It should be understood that step 707 to step 709 may be repeatedly performed until determining of all initial groups is completed.

For example, still with reference to the foregoing example, data mining is performed again based on the remaining scattered data flows shown in Table 7. A data flow a and a data flow c satisfy a same first flow parameter rule, and may be generated as a data flow group 4a. The data flow group 4a is in the first access mode. A data flow b and a data flow e satisfy a third flow parameter rule, and a data flow group 5a is generated. The data flow group 5a is in the third access mode. A specific mining result is shown in the following Table 8.

TABLE 8

| Data flow group | Server IP address | Server port number | Terminal port number | Port number minimum value | Port number maximum value | Protocol type | Quantity of flows | Terminal IP address set | Second time information | Access mode identifier |
|---|---|---|---|---|---|---|---|---|---|---|
| 1a | 10.10.1.100 | 80 | −1 | 45520 | 45529 | TCP | 7 | 192.168.1.100\|101\| 102\|103 | 1 | 1 |
| 2a | 10.1.0.101 | −1 | 55555 | 8080 | 8081 | TCP | 5 | 192.168.1.102\|103 | 1 | 2 |

TABLE 8-continued

| Data flow group | Server IP address | Server port number | Terminal port number | Port number minimum value | Port number maximum value | Protocol type | Quantity of flows | Terminal IP address set | Second time information | Access mode identifier |
|---|---|---|---|---|---|---|---|---|---|---|
| 3a | 10.1.0.101 | 90 | −1 | 45523 | 45559 | TCP | 4 | 192.168.1.100\|101\| 102\|103 | 1 | 1 |
| 4a | 10.1.1.102 | 45530 | −1 | 7060 | 45556 | UDP | 2 | 192.168.1.102\|103 | 1 | 1 |
| 5a | 10.1.1.103 | 45531\|80 | 45559\|8090 | −1 | −1 | UDP | 2 | 192.168.1.102\|103 | 1 | 3 |

Processing manner 2: Data flow group mining is first performed, then data flow cleaning is performed, and finally combination processing is performed.

(1) Data flow group mining and cleaning: For example, first, data mining is performed again according to first group parameters of scattered data flows in original samples (a plurality of first group parameters within the aggregation period), to attempt to mine a data flow group in the first access mode, a data flow group in the second access mode, and a data flow group in the third access mode. First group parameters (or second group parameters) of each data flow group are determined or updated. The scattered data flow is cleaned, that is, a record of the scattered data flow is deleted. It should be noted that the mined data flow group in the first access mode or the second access mode may already exist before the mining, and if the data flow group already exists. Certainly, the mined data flow group in the first access mode or the second access mode may not exist currently, that is, a new data flow group is mined. For details, refer to the foregoing related descriptions. Details are not described herein again.

(2) Combination processing: Combine the same data flow groups based on the data flow groups mined in (1). For a specific execution manner, refer to the foregoing related descriptions. Details are not described herein again.

It should be noted that, after the management device performs the foregoing processing, a scattered data flow that is not in any preset access mode (the first access mode, the second access mode, or the third access mode) may exist within the aggregation period. This part of data flow may be discarded or may be retained to continue to participate in a subsequent operation. For example, "second group parameters" of the scattered data flow are determined.

Step 603: The management device determines second group parameters of each data flow group.

The second group parameters may be the first group parameters. As described above, group parameters configured on different devices may be different. Therefore, to distinguish from group parameters determined by another device, the group parameters determined by the manage-ment device are referred to as the second group parameters, and the group parameters that are sent by the another device and that are received by the management device are referred to as the first group parameters.

For example, the second group parameters may include a server IP address, a terminal port number minimum value, a terminal port number maximum value, a server port number minimum value, a server port number maximum value, a protocol type, a flow support, a device access support, and the like.

For ease of description, the second group parameters are described below in a list form. For example, Table 9 shows second group parameters obtained within an aggregation period. It should be noted that Table 9 is an independent example for description, and is not necessarily determined based on Table 1 to Table 8.

TABLE 9

| Server IP address | Terminal port number minimum value | Terminal port number maximum value | Server port number minimum value | Server port number maximum value | Protocol type | Quantity of flows | Terminal IP address set | Second time infor-mation | Access mode iden-tifier | Quantity of terminal devices | Flow support (%) | Device access support (%) |
|---|---|---|---|---|---|---|---|---|---|---|---|---|
| 10.1.1.100 | 45527 | 65532 | 80 | 80 | TCP | 100 | 192.168.1.100-149 | 1 | 1 | 50 | 33.22 | 60.24 |
| 10.1.0.101 | 55555 | 55555 | 45527 | 65532 | TCP | 150 | 192.168.1.140-169 | 1 | 2 | 30 | 49.83 | 36.35 |
| 10.1.0.102 | 0 | 65532 | 0 | 65532 | UDP | 50 | 192.168.1.170-171 | 1 | 3 | 2 | 16.61 | 2.41 |
| 10.1.1.100 | 45527 | 45527 | 21 | 21 | UDP | 1 | 192.168.1.172 | 2 | 1 | 1 | 0.33 | 1.20 |

The flow support and the device access support are described below.

(1) Flow Support

The flow support is determined based on a quantity of data flows in a data flow group and a total quantity of all data flows in current statistical collection (for example, within an aggregation period). The forwarding device may discard a scattered data flow that is not in any preset access mode. The total quantity of flows may be a total quantity of data flows included in the data flow group. The forwarding device may retain this part of scattered data flow, and the total quantity of flows may be a quantity of all data flows within the aggregation period. One aggregation period is used as an example for description. If the management device performs statistical collection based on a preset time period or a specified time period, a total quantity of data flows is determined based on a quantity of data flows within the preset time period or the specified time period. For example, the flow support satisfies: Flow support=Quantity of flows in the data flow group/Total quantity of flows. For example, refer to the data flow group shown in the first row of Table 9. Flow support of the data flow group=100/(100+150+50+1)*100%=33.22%.

(2) Device Access Support

The device access support is determined based on a quantity of terminals in a data flow group and a total quantity of terminals corresponding to all data flows in current statistical collection. Likewise, all the data flows in the current statistical collection may be data flows included in data flow groups. If scattered data flows are retained, all the data flows are data flows in the data flow groups and scattered data flows. Similarly, all the data flows in current statistical collection are data flows within an aggregation period, a preset time period, or a specified time period. Refer to the foregoing descriptions, and details are not described herein again. For example, the device access support satisfies: Device access support=Quantity of terminals in the data flow group/Total quantity of terminals. For example, continue to refer to the data flow group shown in the first row of Table 9. Device access support of the data flow group=50/(50+30+2+1)*100%=60.24%.

It should be noted that: (1) In FIG. 7A and FIG. 7B, the second group parameters of the combined or updated data flow group may be directly determined. (2) If the management device is a cloud platform, the cloud platform may receive the second group parameters reported by one or more network management devices, the cloud platform may directly store the second group parameters, and the cloud platform may perform data flow group mining again according to a plurality of second group parameters. For details, refer to the operations performed by the execution body in FIG. 6 or FIG. 7A and FIG. 7B. Details are not described herein again.

Figure 8:
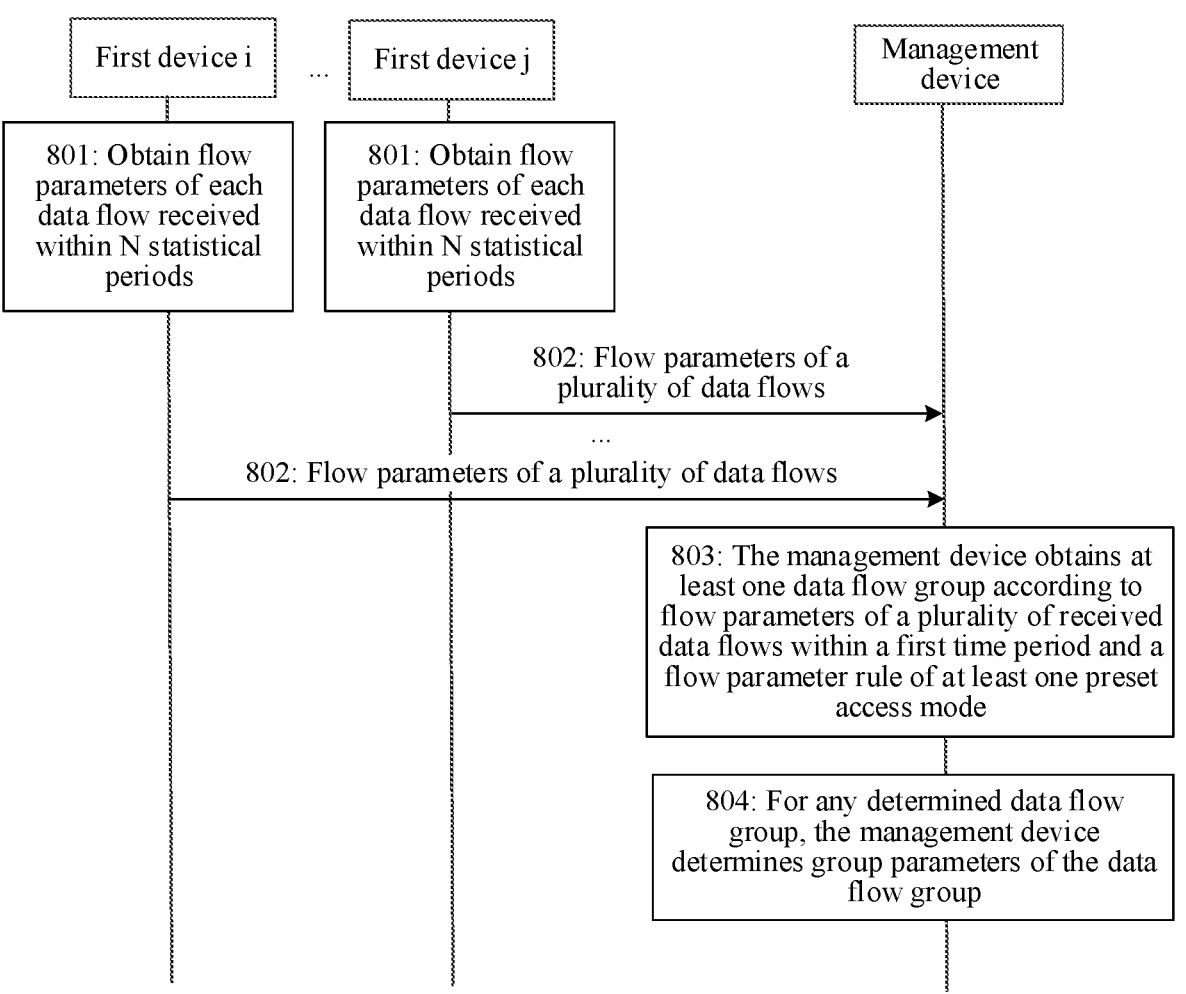
FIG. 8 is a schematic flowchart of a method for determining data flow information according to an embodiment of this application.

An embodiment of this application further provides another method for determining data flow information. In the method, a forwarding device or a bypass device of a forwarding device may send flow parameters (for example, a flow record table) of a plurality of data flows obtained through statistical collection to a management device. In other words, the forwarding device or the bypass device does not perform data mining, and only the management device performs data mining. FIG. 8 is a schematic flowchart of a method for determining data flow information according to an embodiment of this application. The method includes the following steps.

Step 801: A first device obtains flow parameters of each data flow received within N statistical periods, where N is a positive integer.

For example, the first device is a forwarding device. When the forwarding device performs step 801, refer to detailed descriptions of step 201 above. Details are not described herein again.

In another example, the first device may alternatively be a bypass device (for example, the network probe described above) of the forwarding device. For ease of understanding, a network architecture including the bypass device is first briefly described. In a same network architecture, one management device may be connected to one or more bypass devices, and one bypass device may correspond to one or more forwarding devices.

Step 802: The first device sends flow parameters of a plurality of data flows to the management device. Correspondingly, the management device receives the flow parameters of the plurality of data flows that are sent by one or more first devices.

For example, the bypass device is a network probe. A complete process in which the network probe is used as an execution body to perform step 801 is described below. For a manner in which the forwarding device receives a data packet and mirrors the data packet to the network probe, refer to the foregoing related descriptions. Details are not described herein again. Subsequently, the network probe separately determines flow parameters of a plurality of data flows received from one or more forwarding devices, and sends the flow parameters to the management device.

Similarly, in an implementation, the first device may directly send the obtained flow parameters of each data flow of the data flows to the management device. In another possible implementation, the first device may report the flow parameters of the plurality of data flows to the management device according to a reporting period. Specifically, for example, the bypass device may report 5-tuple information and first time information of the data flow to the management device. In another example, the bypass device may generate a flow record table, and report the flow record table to the management device. Certainly, if flow parameters of a data flow are determined by the network probe, first time information of the data flow may be time at which the network probe receives the data flow. For other procedures, refer to the specific operation steps of generating a flow record table by the forwarding device in FIG. 2. Details are not described herein again.

Step 803: The management device groups a plurality of data flows within a first time period according to flow parameters of the plurality of received data flows and at least one preset access mode, to obtain at least one data flow group.

The management device may receive the flow parameters of the plurality of data flows that are sent by the one or more first devices. The flow parameters include 5-tuple information and first time information of the data flows. Because lengths of reporting periods on different first devices may be different, the management device may divide, based on the first time information of the plurality of data flows, a plurality of data flows that belong to a same time period (for example, denoted as the first time period). For example, second time information of the data flow is determined based on the first time information of the data flow. For details, refer to the foregoing related descriptions. Data flows with same second time information are data flows within a same time period. Alternatively, a customized time period may be used. This is not limited in embodiments of this application.

For example, the management device determines the plurality of data flows within the first time period based on the aggregation period. Similarly, the first time period may be a same time period on different dates. The plurality of data flows within the first time period within the aggregation period are grouped. Specifically, a manner in which the management device groups the plurality of data flows includes: first determining a data flow group in the first access mode according to the flow parameters of the plurality of data flows, then determining a data flow group in the second access mode based on remaining data flows, finally determining a data flow group in the third access mode based on remaining data flows after the previous step is completed, and determining a remaining data flow that is not grouped into a data flow group as a scattered data flow. As described above, the scattered data flow may be discarded or retained. For details, refer to related descriptions in one or more of the foregoing embodiments. Details are not described herein again.

For a method for determining a data flow group in the first access mode or the second access mode, refer to descriptions in FIG. 3 or FIG. 4. For a method for determining a data flow group in the third access mode, refer to descriptions in step 706 to step 709 in FIG. 7A and FIG. 7B. Details are not described herein again.

Step 804: For any determined data flow group, the management device determines group parameters of the data flow group.

For example, the group parameter may be the group parameter shown in Table 9 above. Details are not described herein again. Certainly, if the flow support is determined, the record of the quantity of flows in the group parameter may be deleted. Similarly, if the device access support is determined, the record of the quantity of terminal devices in the group parameter may be deleted.

Figure 9:
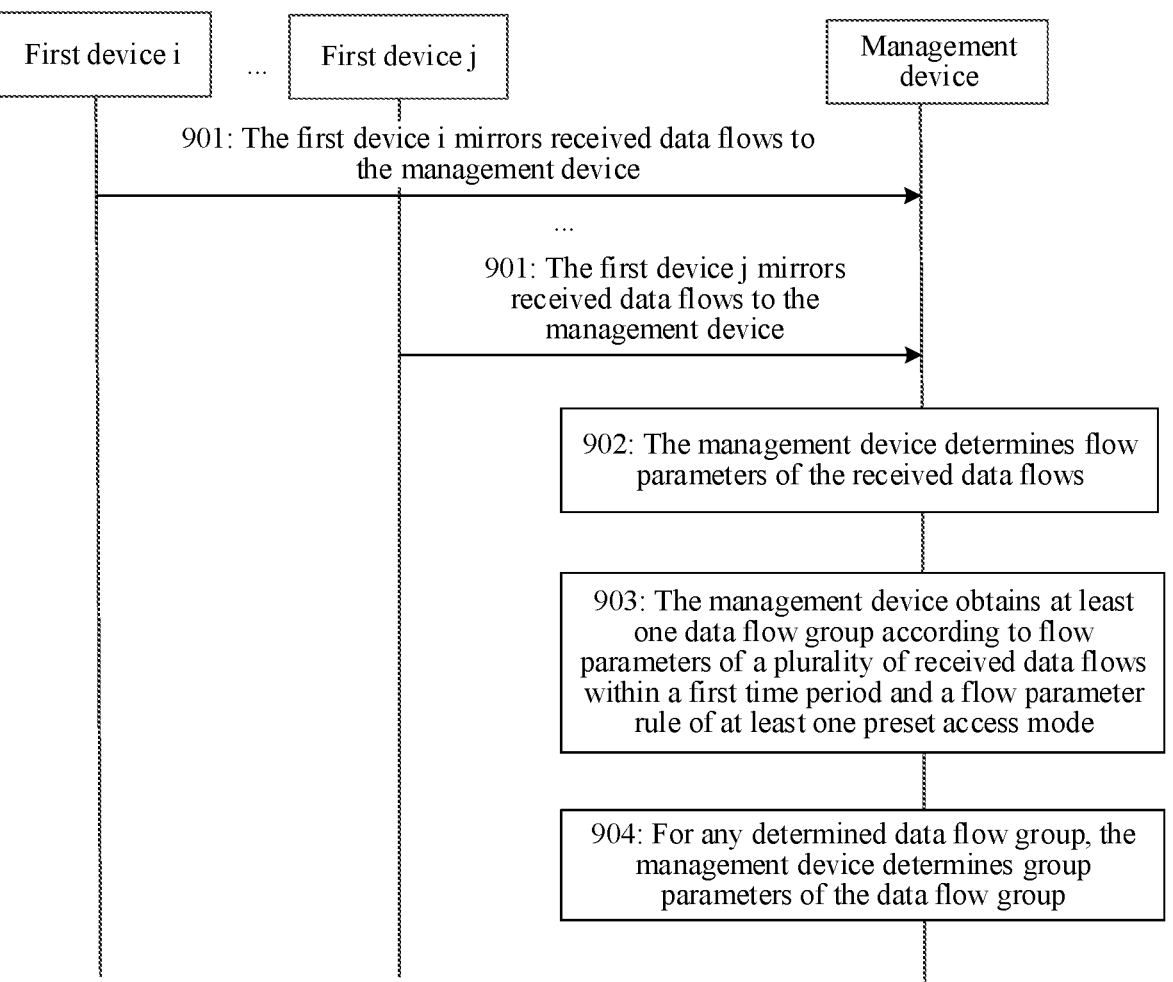
FIG. 9 is a schematic flowchart of another method for determining data flow information according to an embodiment of this application.

An embodiment of this application further provides another data processing method. In the method, a forwarding device or a bypass device mirrors a data flow to a management device, and the management device generates flow parameters of the data flow, and performs a subsequent procedure. Refer to FIG. 9. The method includes the following steps.

Step 901: A first device mirrors a received data packet to the management device. Correspondingly, the management device receives the data packet forwarded by the first device.

For example, the first device may be a forwarding device. As described above, the forwarding device copies the received data packet, and mirrors an obtained copy of the data packet to the management device.

In another example, the first device may further include a bypass device. As described above, the forwarding device mirrors the copy of the data packet to the bypass device, and the bypass device may mirror the received data packet to the management device again.

Step 902: The management device determines flow parameters of a received data flow.

The flow parameters include 5-tuple information and first time information of the data flow. The first time information may be determined based on time at which the management device receives the data flow.

Step 903: The management device groups a plurality of data flows within a first time period according to flow parameters of the plurality of received data flows and at least one preset access mode, to obtain at least one data flow group.

Step 904: For any determined data flow group, the management device determines group parameters of the data flow group.

For step 902, refer to detailed descriptions of a similar step such as step 201 or step 801. For step 903 and step 904, refer to detailed descriptions of step 803 and step 804. Details are not described herein again.

The management device may store (second) group parameters of a plurality of data flow groups obtained within each aggregation period, for example, store the group parameters in a group parameter database. The group parameter database may be deployed on the management device, or may be deployed on another device, for example, an independent storage server. For example, the group parameter database is deployed on a cloud platform. In this case, historical group parameter information includes all group parameters received by the cloud platform or determined by the cloud platform. These group parameters may be subsequently used for abnormal data flow detection or security rule formulation. A device configured to perform abnormal data flow detection or security rule formulation is referred to as a third device in the following. The third device may be a management device (for example, any network management device or cloud platform) in a network architecture, or may be an independently deployed device.

An application manner of historical group parameters is described below.

Figure 10:
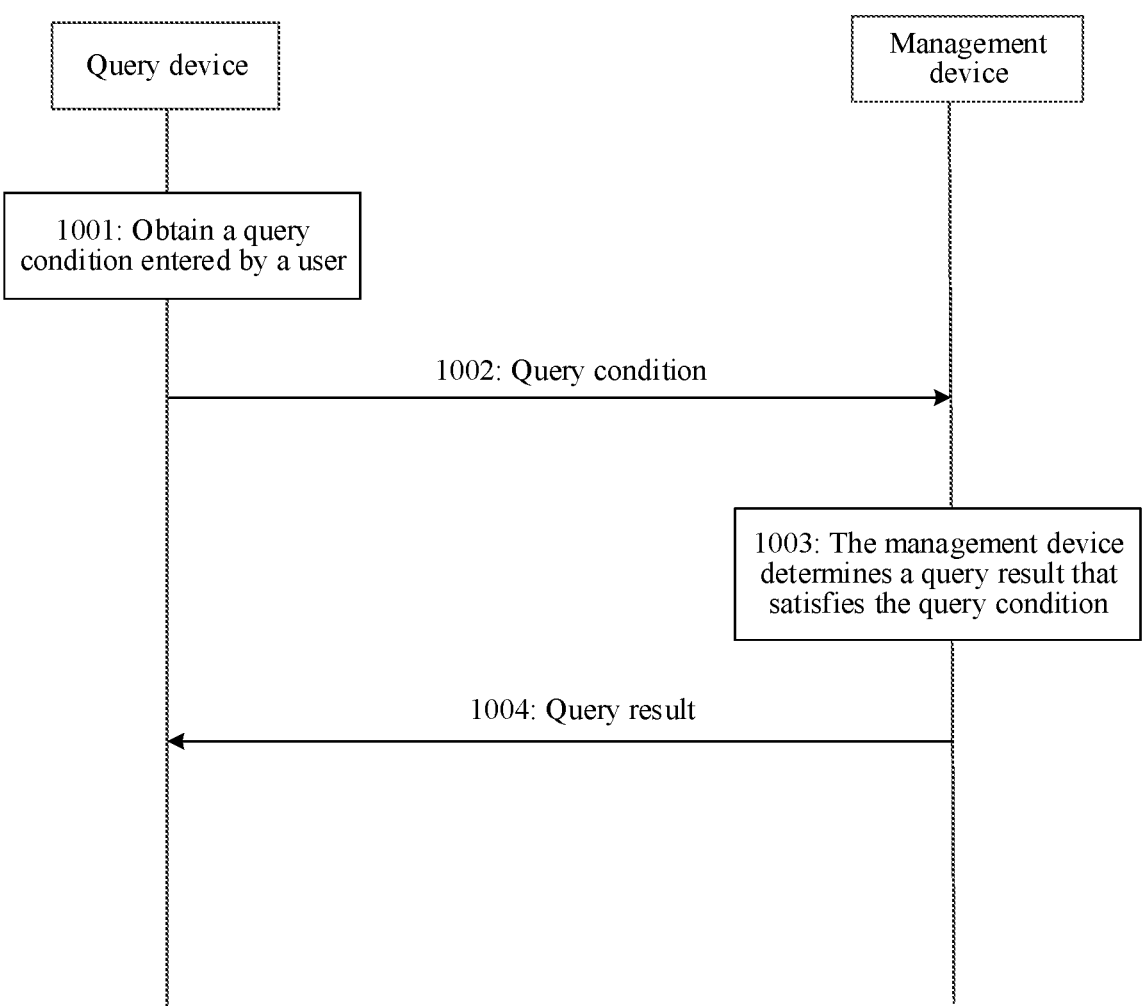
FIG. 10 is a schematic diagram of a query scenario according to an embodiment of this application.

FIG. 10 is a schematic flowchart of a group parameter application method according to an embodiment of this application. The method may be applied to a third device and a management device integrating a group parameter database. It should be noted that the third device and the management device may be deployed on different devices, or may be deployed on a same device. As shown in FIG. 10, the method includes the following steps.

Step 1001: The third device receives a query condition entered by a user, where the query condition includes a query field.

For example, an embodiment of this application further provides a user interface integrated into the third device. The user interface includes a query entry area and a result display area. The query entry area is used to enter a query field, for example, a field related to a group parameter. The result display area displays a query result.

The query field may be, but is not limited to, some or all of the following: a flow support, a device access support, a server IP, a terminal port number, a server port number, a protocol type, a quantity of flows, a terminal IP address set, a quantity of terminal devices, second time information, and an access mode identifier.

For example, the query condition may be that the server IP address is 10.0.0.1. In another example, the query condition may be that the server port number is 8080. The query condition may further include a query threshold. For example, if a query condition is that the flow support is greater than 50%, the query threshold is 50%. In another example, a query condition is that the device access support is less than 2%. In still another example, a query condition is that the device access support is between 60% and 100%.

Step 1002: The third device sends the query condition to the management device. Correspondingly, the management device receives the query condition sent by the third device.

Step 1003: The management device determines a query result that satisfies the query condition.

In an implementation, the management device determines, according to the group parameter database, the query result that satisfies the query condition. The query result includes some or all of group parameters of data flow groups that are determined by the management device according to the group parameter database and that match the query condition or whose group parameters satisfy the query threshold. For example, if the query condition is that the server IP address is 10.0.0.1, the query result includes some or all group parameters of data flow groups that are determined by the management device based on historical group parameters in the group parameter database and whose server IP addresses are 10.0.0.1. In another example, if the query condition is that the flow support is less than 2%, the management device may determine, according to the historical group parameters in the group parameter database, a data flow group (referred to as a target data flow group) whose flow support is less than 2%, and a query result may be some or all of group parameters of the target data flow group recorded in the historical group parameters, for example, a server IP address, a server port number, and a protocol type of the target data flow group.

Step 1004: The management device sends the query result to the third device, and correspondingly, the third device receives the query result sent by the management device.

For example, the third device may display the query result on the user interface in step 1001, for the user to browse and view.

The foregoing scenario may be applied to abnormal data flow detection. For example, data flows whose flow support is less than 2% are queried, and these data flows may be abnormal data flows. In the manner, an abnormal data flow can be detected in time. This improves efficiency and accuracy of detecting the abnormal data flow. Alternatively, the third device may automatically generate a security rule based on the query result. For example, the third device may formulate the security rule according to some or all data items in the group parameters of the destination data flow group included in the query result. Specifically, some or all data items in one set of group parameters of the target data flow group whose flow support is greater than a first threshold or device access support is greater than a second threshold may be used to formulate a whitelist. For example, the query result includes the group parameters of the target data flow group 1. The flow support of the target data flow group 1 is 80%, the first threshold is 51%, and the group parameters include a server IP address of 10.0.0.1 and a server port number range of 8080 to 8090. In this case, a data flow whose server IP is 10.0.0.1 and server port number is between 8080 and 8090 is a data flow of which forwarding is allowed, and belongs to the whitelist. Similarly, some or all data items in a set of group parameters of a target data flow group whose flow support is less than a third threshold or whose device access support is less than a fourth threshold may be used to formulate a blacklist. For example, a query result includes group parameters of a target data flow group 2. For the target data flow group 2, a flow support is 3%, the third threshold is 15%, and the group parameters include a server IP address of 10.0.1.100 and a server port number range of 45532 to 45562. In this case, a data flow whose server IP address is 10.0.1.100 and server port number is between 45532 and 45562 is a data flow that needs to be intercepted, and belongs to the blacklist. The foregoing manner avoids merely relying on manual experience to configure a security rule. This improves reliability of data access in the network.

Figure 11:
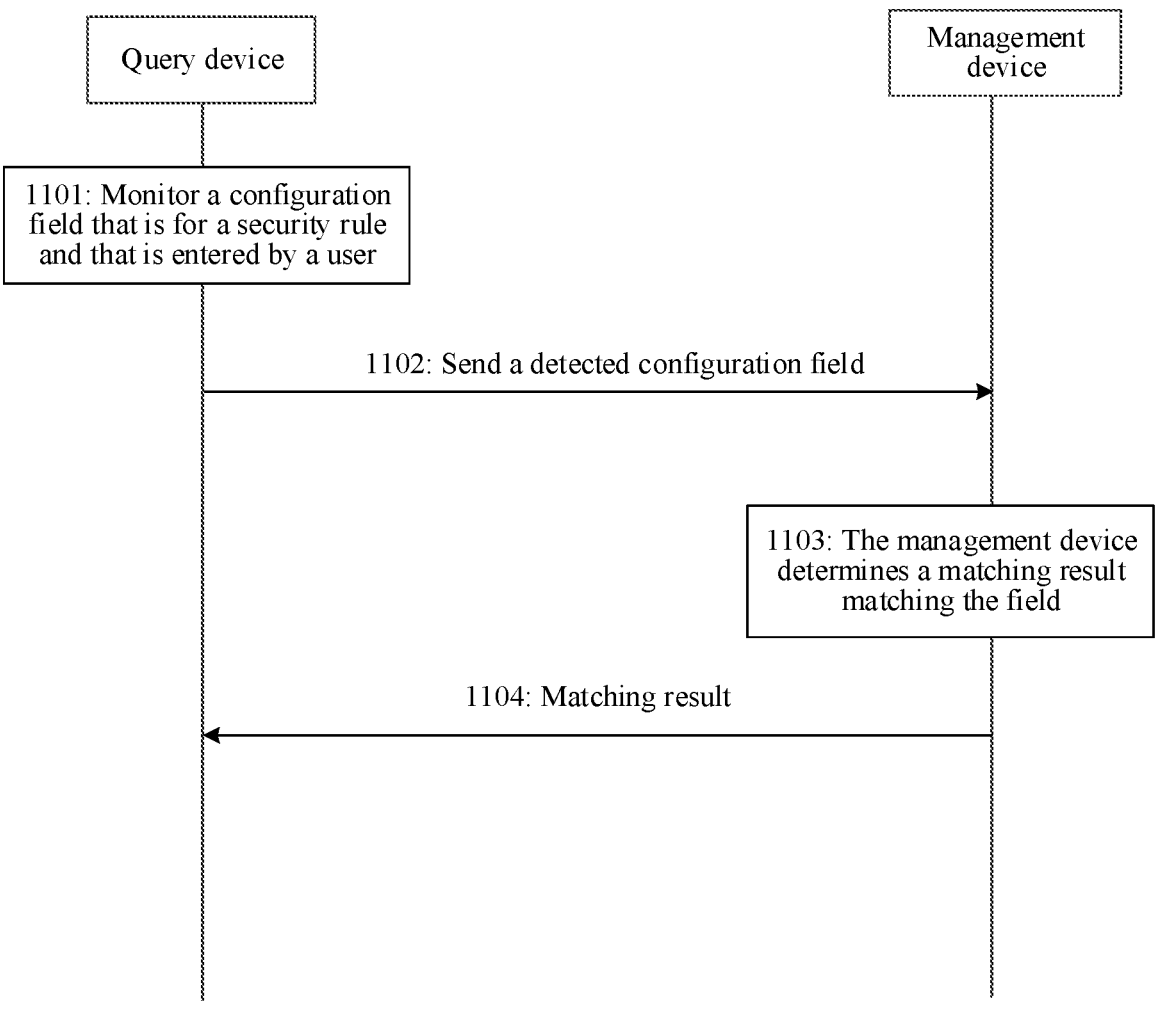
FIG. 11 is a schematic diagram of another query scenario according to an embodiment of this application.

FIG. 11 is a schematic flowchart of a group parameter application method according to an embodiment of this application. The method may be applied to a third device and a management device integrating a group parameter database. It should be noted that the third device and the management device may be deployed on different devices, or may be deployed on a same device. As shown in FIG. 11, the method includes the following steps.

Step 1101: The third device monitors a configuration field entered by a user on a security rule configuration interface.

The configuration field includes, but is not limited to: a server IP address, a server port number range, a terminal port number range, and a protocol type, and may further include a terminal IP address, an allowed access time, and the like. For example, when the whitelist is configured, a security rule field of a data flow of which forwarding is allowed includes: a server IP address is 10.1.0.100, a server port number minimum value is 45527, a server port number maximum value is 65532, a terminal port number is 80, a protocol type is TCP, and an allowed access time is 8:00-11:30, 8:00-17:00, or the like. Subsequently, if a data flow received by a forwarding device satisfies the whitelist, the forwarding device may forward the data flow.

Step 1102: The third device sends the detected configuration field to the management device, and correspondingly, the management device receives the configuration field sent by the third device.

In an implementation, the third device may automatically and continuously send detected configuration fields to the management device. In practice, the third device may continuously perform monitoring in a user input process, and synchronously send, to the management device, a configuration field detected in real time. In another possible implementation, the third device may send, to the management device after receiving a confirmation operation of the user, a configuration field currently entered by the user.

Step 1103: The management device determines a matching result matching the configuration field.

In an implementation, the management device queries, according to a group parameter database, a group parameter that is in historical group parameters and that is of a target data flow group matching the configuration field. For example, the management device may query the group parameter database for group parameters of all target data flow groups whose server IP addresses are 10.1.01.100. In another example, the management device may sort a plurality of found target data flow groups according to dimensions such as time, a flow support, and a device access support, and send (some or all) group parameters of top N target data flow groups to the third device. Specifically, when the whitelist is configured, sorting may be performed in descending order of values, and some or all group parameters of top N target data flows are selected for feedback. When the blacklist is configured, sorting is performed in ascending order of values, and some or all group parameters of top and bottom N target data flow groups are selected for feedback. For example, when sending the configuration field, the third device further sends indication information used to indicate that the third device is configuring a whitelist or a blacklist, to notify the management device whether the configuration field sent by the third device is used to configure a whitelist or a blacklist.

A process in which the management device determines a matching result based on some fields is described below. Subsequently, the management device may further continuously receive other fields. For example, after receiving a field 1 that a server IP address is 10.1.01.100, the management device may further receive a field 2 that a terminal port number is 80. When receiving the field 1, the management device queries a matching result 1 of the field 1, and when receiving the field 2, the management device queries a matching result 2 of the field 2 based on the matching result 1.

It should be noted that, if no result matching the query field is found, information such as that the query field does not exist or the matching fails is fed back to the third device.

Step 1104: The management device sends the matching result to the third device, and correspondingly, the third device receives the matching result sent by the management device.

Optionally, the third device may display the matching result for the user to browse and view the matching result, and the user may generate the security rule according to experience and with reference to the matching result. Alternatively, the third device may automatically generate a security rule. For example, after receiving the matching result, the third device automatically extracts flow parameters in the matching result, and writes the flow parameters into corresponding parameter items in the security rule configuration interface. Optionally, after clicking OK, the user determines to generate the security rule. For details, refer to the foregoing description of generating the whitelist and the blacklist according to the group parameters in the query result. Details are not described herein again.

In the foregoing manner, a manner of generating a security rule based on an access behavior of data flows transmitted on a network is implemented, to avoid merely relying on manual experience to configure a security rule. This improves reliability of data access in the network.

Figure 12:
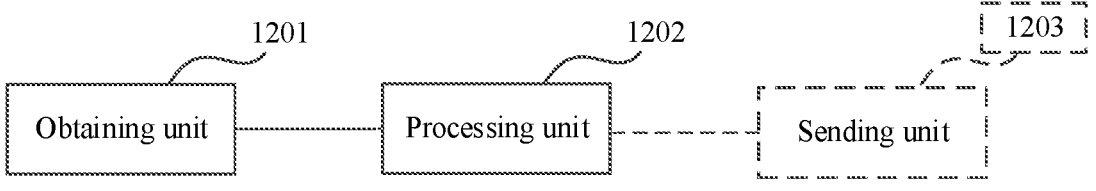
FIG. 12 is a schematic diagram of a structure of an apparatus for determining data flow information according to an embodiment of this application.

Based on a same inventive concept as the method embodiments, an embodiment of this application further provides an apparatus for determining data flow information, configured to perform functions performed by the first device in FIG. 2 to FIG. 4 or the management device in FIG. 8 and FIG. 9 in the foregoing method embodiments. As shown in FIG. 12, the apparatus includes an obtaining unit 1201 and a processing unit 1202.

The obtaining unit 1201 is configured to obtain flow parameters of a plurality of data flows within a first time period, where the flow parameters include a protocol type, a terminal port number, a server IP address, and a server port number. For a specific implementation, refer to a description of step 201 in FIG. 2, step 801 and step 802 in FIG. 8, or step 901 and step 902 in FIG. 9. Details are not described herein again.

The processing unit 1202 is configured to: obtain at least one data flow group according to a flow parameter rule of at least one preset access mode and the flow parameters of the plurality of data flows, where a relationship between data flows in each data flow group satisfies a flow parameter rule of one preset access mode; and determine group parameters of each data flow group, where the group parameters include a server IP address, a server port number range, a terminal port number range, and a protocol type, and the group parameters of the data flow group are determined according to the flow parameters of the data flows included in the data flow group. For a specific implementation, refer to descriptions of step 202 and step 203 in FIG. 2, step 803 and step 804 in FIG. 3 or FIG. 4 or FIG. 8, or step 903 and step 904 in FIG. 9. Details are not described herein again.

Optionally, the apparatus further includes a sending unit 1203, and the sending unit 1203 is further configured to: send group parameters of a plurality of data flow groups determined within the reporting period to the management device, or send group parameters of a plurality of data flow groups determined within the reporting period and flow parameters of scattered data flows to the management device, where the scattered data flows are data flows that do not belong to any data flow group within the reporting period. For a specific implementation, refer to step 204 in FIG. 2. Details are not described herein again.

In a possible implementation method, the apparatus is a management device. The obtaining unit 1201 is further configured to receive a plurality of statistical results, where the plurality of statistical results are from one or more first devices. For a specific implementation, refer to a description of the step 601 in FIG. 6. Details are not described herein again. The processing unit 1202 is further configured to: obtain a plurality of statistical results within a second time period from the plurality of received statistical results, combine at least two data flow groups in the plurality of statistical results based on the plurality of statistical results within the second time period, and update group parameters of a combined data flow group according to group parameters of each data flow group in the at least two data flow groups, where a relationship between data flows in the at least two data flow groups satisfies the first flow parameter rule or satisfies the second flow parameter rule. The statistical result further includes scattered data flows that are not grouped into a data flow group. The at least one preset access mode further includes the third access mode. The processing unit 1202 is further configured to: combine the scattered data flows in the plurality of statistical results within the second time period with a target data flow group, and update group parameters of a combined data flow according to the flow parameters of the scattered data flows and group parameters of the target data flow group, where a relationship between a data flow in the target data flow group and the scattered data flow satisfies the first flow parameter rule or the second flow parameter rule. The management device determines the data flow group in the third access mode based on remaining scattered data flows. For a specific implementation, refer to descriptions of step 602 and step 603 in FIG. 6, or a description in FIG. 7A and FIG. 7B. Details are not described herein again.

In a possible implementation method, the group parameters identify an abnormal data flow or are used to determine a security rule, and the security rule is used to control forwarding of a data flow.

In a possible implementation method, the apparatus is a management device. The management device stores group parameters of historical data flow groups. The obtaining unit 1201 is further configured to receive a query request, where the query request indicates a query condition, and the query condition includes one or more of to-be-queried group parameters. The processing unit 1202 is further configured to: determine a query result that satisfies the query condition, and send the query result. For a specific implementation, refer to the description in FIG. 10 or FIG. 11. Details are not described herein again.

Figure 13:
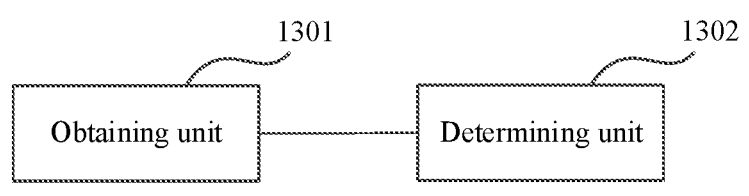
FIG. 13 is a schematic diagram of a structure of another apparatus for determining data flow information according to an embodiment of this application.

Based on a same inventive concept as the method embodiments, an embodiment of this application further provides a device for determining data flow information, configured to perform functions performed by the third device in FIG. 10 or FIG. 11 in the foregoing method embodiments. As shown in FIG. 13, the device includes an obtaining unit 1301 and a determining unit 1302.

The obtaining unit 1301 is configured to obtain group parameters of a target data flow group, where the group parameters include a server IP address, a server port number range, a terminal port number range, and a protocol type. The determining unit 1302 is configured to determine a security rule according to the group parameters, where the security rule includes a blacklist and/or a whitelist, the blacklist indicates a data flow that needs to be intercepted, and the whitelist indicates a data flow that needs to be forwarded.

In a possible implementation method, a flow support of the target data flow group is greater than a first threshold or a device access support of the target data flow group is greater than a second threshold; and the group parameters are used to determine the whitelist; or
   a flow support of the target data flow group is less than a third threshold or a device access support of the target data flow group is less than a fourth threshold; and the group parameters are used to determine the blacklist.

Figure 14:
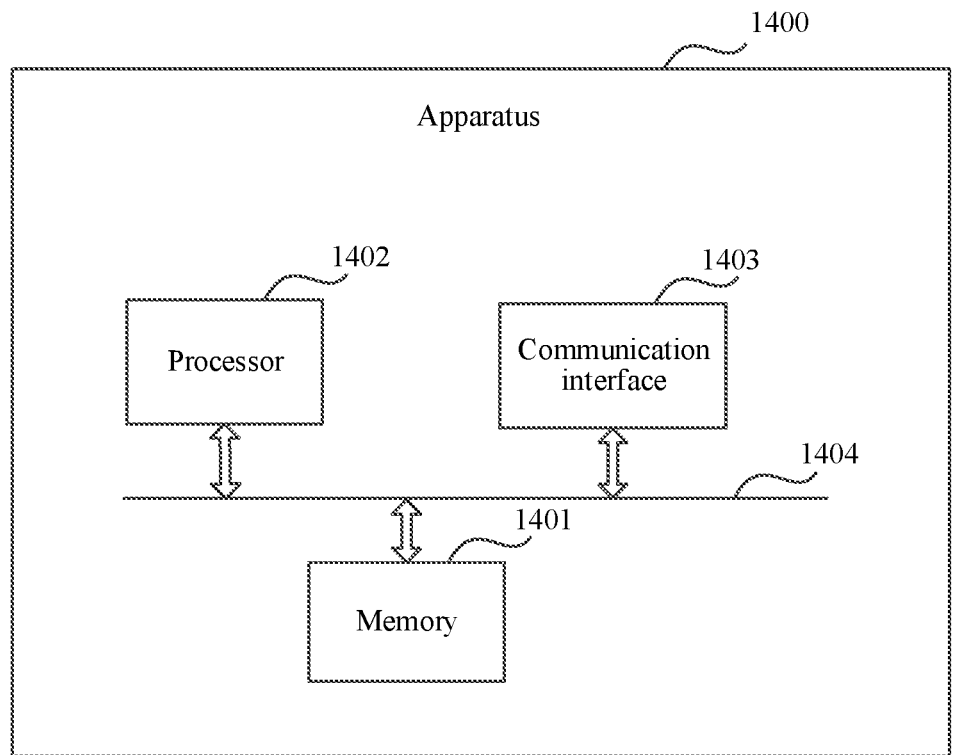
FIG. 14 is a schematic diagram of a structure of still another apparatus for determining data flow information according to an embodiment of this application.

FIG. 14 is a schematic diagram of an apparatus according to this application. The apparatus may be the forwarding device, the device connected to the forwarding device in bypass mode, the management device, or the third device in the foregoing embodiments. The apparatus 1400 includes a processor 1402 and a communication interface 1403.

Optionally, the apparatus 1400 may further include a memory 1401 and/or a communication line 1404. The communication interface 1403, the processor 1402, and the memory 1401 may be connected to each other by using a communication line 1404. The communication line 1404 may be a peripheral component interconnect (PCI) bus, an extended industry standard architecture (EISA) bus, or the like. The communication line 1404 may be grouped into an address bus, a data bus, a control bus, and the like. For ease of representation, only one bold line is used to represent the bus in FIG. 14, but this does not mean that there is only one bus or only one type of bus.

The processor 1402 may be a CPU, a microprocessor, an ASIC, or one or more integrated circuits configured to control program execution in the solutions of this application.

The communication interface 1403 uses any apparatus like a transceiver, and is configured to communicate with another device or a communication network, such as Ethernet, a radio access network (RAN), a wireless local area network (WLAN), or a wired access network.

The memory 1401 may be a ROM, another type of static storage device that can store static information and instructions, a RAM, or another type of dynamic storage device that can store information and instructions, or may be an electrically erasable programmable read-only memory (EE-PROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of instructions or a data structure and that can be accessed by a computer. However, the memory is not limited thereto. The memory may exist independently, and is connected to the processor through the communication line 1404. The memory may alternatively be integrated with the processor.

The memory 1401 is configured to store computer-executable instructions for performing the solutions of this application, and execution of the computer-executable instructions is controlled by the processor 1402. The processor 1402 is configured to execute the computer-executable instructions stored in the memory 1401, to implement the method for determining data flow information provided in the foregoing embodiments of this application.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

Optionally, the computer-executable instructions in this embodiment of this application may also be referred to as application program code. This is not specifically limited in this embodiment of this application.

A person of ordinary skill in the art may understand that various numbers such as "first" and "second" in this application are merely used for differentiation for ease of description, and are not used to limit the scope of embodiments of this application or represent a sequence. The term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects. "At least one" means one or more. "At least two" means two or more. "At least one", "any one", or a similar expression thereof indicates any combination of the items, and includes a singular item (piece) or any combination of plural items (pieces). For example, at least one of a, b, or c may indicate a, b, c, a and b, a and c, b and c, or a, b, and c, where a, b, and c may be singular or plural. The term "a plurality of" means two or more, and another quantifier is similar to this. In addition, an element that appears in singular forms "a", "an", and "the" does not mean "one or only one" unless otherwise specified in the context, but means "one or more". For example, "a device" means one or more such devices.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

The various illustrative logical units and circuits in embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor so that the processor may read information from the storage medium and write information to the storage medium. Alternatively, the storage medium may be integrated into a processor. The processor and the storage medium may be disposed in the ASIC.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although this application is described with reference to specific features and embodiments thereof, it is clear that various modifications and combinations may be made to them without departing from the spirit and scope of this application. Correspondingly, the specification and accompanying drawings are merely example descriptions of this application defined by the appended claims, and are considered as any of or all modifications, variations, combinations or equivalents that cover the scope of this application. It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method for determining data flow information, applied to a first device, and comprising:
   obtaining flow parameters of a plurality of data flows within a first time period, wherein the flow parameters comprise a protocol type, a terminal port number, a server internet protocol (IP) address, and a server port number;
   obtaining at least one data flow group according to a flow parameter rule of at least one preset access mode and the flow parameters of the plurality of data flows, wherein a relationship between data flows in each data flow group satisfies a flow parameter rule of one preset access mode; and
   determining group parameters of each data flow group, wherein the group parameters comprise a server IP address, a server port number range, a terminal port number range, and a protocol type, and the group parameters of the data flow group are determined according to the flow parameters of the data flows comprised in the data flow group, and
   wherein the group parameters further comprise at least one of the following: a terminal IP address set, a quantity of data flows, time mode information, an access mode identifier, a flow support, or a device access support, wherein the terminal IP address set comprises different terminal IP addresses corresponding to the data flows in the data flow group; the quantity of data flows is a quantity of the data flows comprised in the data flow group; the time mode information indicates a preset time mode that the data flow group is in, and different preset time modes are in a one-to-one correspondence with preset time ranges; the access mode identifier identifies a preset access mode that the data flow group is in; the flow support is determined based on the quantity of the data flows in the data flow group and a total quantity of the data flows within the first time period; and the device access support is determined based on a quantity of terminals corresponding to the data flow group and a total quantity of terminals corresponding to the data flows within the first time period.

2. The method according to claim 1, wherein the group parameters identify an abnormal data flow or are used to determine a security rule, and the security rule is used to control forwarding of a data flow.

3. The method according to claim 2, wherein the first device is a management device, and the management device stores group parameters of historical data flow groups; and the method further comprises:
   receiving a query request sent by a third device, wherein the query request indicates a query condition, and the query condition comprises a flow support threshold and/or a device access support threshold;
   determining a target group parameter from the group parameters of the historical data flow groups, wherein a flow support of the target group parameter satisfies the flow support threshold and/or a device access support of the target group parameter satisfies the device access support threshold; and
   sending the target group parameter to the third device.

4. The method according to claim 1, wherein the at least one preset access mode comprises one or more of the following modes: a first access mode, a second access mode, or a third access mode, wherein
   a relationship between data flows in a data flow group in the first access mode satisfies a first flow parameter rule, and the first flow parameter rule comprises: for the data flows in the data flow group, protocol types are same, terminal port numbers are different, server port numbers are same, and server IP addresses are same; or for the data flows in the data flow group, protocol types are same, terminal port numbers are different, server port numbers are same, and server IP addresses belong to a same preset IP address group;
   a relationship between data flows in a data flow group in the second access mode satisfies a second flow parameter rule, and the second flow parameter rule comprises: for the data flows in the data flow group, protocol types are same, server port numbers are different, terminal port numbers are same, and server IP addresses are same; or for the data flows in the data flow group, protocol types are same, server port numbers are different, terminal port numbers are same, and server IP addresses belong to a same preset IP address group; and
   a relationship between data flows in a data flow group in the third access mode satisfies a third flow parameter rule, and the third flow parameter rule comprises: for the data flows in the data flow group, protocol types are same, server port numbers are different, terminal port numbers are different, and server IP addresses are same; or for the data flows in the data flow group, protocol types are same, server port numbers are different, terminal port numbers are different, and server IP addresses belong to a same preset IP address group.

5. The method according to claim 4, wherein the at least one preset access mode comprises the first access mode and the second access mode; and

the obtaining at least one data flow group according to a
flow parameter rule of at least one preset access mode
and the flow parameters of the plurality of data flows
comprises:
determining, according to the flow parameters of the
plurality of data flows within the first time period, the
data flow group in the first access mode, and determin-
ing, according to flow parameters of remaining data
flows, the data flow group in the second access mode.
6. The method according to claim 5, wherein the first
device is a management device, and the at least one preset
access mode further comprises the third access mode; and
the method further comprises:
determining the data flow group in the third access mode
based on data flows that are in the plurality of data
flows within the first time period and that are other than
the data flows in the data flow groups in the first access
mode and the second access mode.
7. The method according to claim 4, wherein the first
device is a forwarding device or a device connected to the
forwarding device in bypass mode; and
the method further comprises:
obtaining group parameters of a plurality of data flow
groups that are determined according to flow param-
eters of data flows within a plurality of time periods,
wherein the plurality of time periods comprise the first
time period; and
combining at least two data flow groups in the plurality of
data flow groups, and determining group parameters of
a combined data flow group according to the group
parameters of the at least two data flow groups, wherein
a relationship between data flows in the at least two
data flow groups satisfies the first flow parameter rule
or the second flow parameter rule.
8. The method according to claim 1, wherein the first
device is a forwarding device or the first device connected
to the forwarding device in bypass mode, and the method
further comprises:
sending group parameters of a data flow group that are
determined by the first device to a management device.
9. The method according to claim 1, wherein the first
device is a management device, the flow parameters of the
plurality of data flows within the first time period are from
a plurality of second devices, and the plurality of second
devices comprise at least one of a forwarding device or a
device connected to the forwarding device in bypass mode.
10. An apparatus, comprising at least one processor
coupled to at least one memory storing instructions and
configured to execute the instructions to cause the apparatus
to:
obtain flow parameters of a plurality of data flows within
a first time period, wherein the flow parameters com-
prise a protocol type, a terminal port number, a server
internet protocol (IP) address, and a server port num-
ber;
obtain at least one data flow group according to a flow
parameter rule of at least one preset access mode and
the flow parameters of the plurality of data flows,
wherein a relationship between data flows in each data
flow group satisfies a flow parameter rule of one preset
access mode; and
determine group parameters of each data flow group,
wherein the group parameters comprise a server IP
address, a server port number range, a terminal port
number range, and a protocol type, and the group
parameters of the data flow group are determined according to the flow parameters of the data flows
comprised in the data flow group, and
wherein the group parameters further comprise at least
one of the following: a terminal IP address set, a
quantity of data flows, time mode information, an
access mode identifier, a flow support, or a device
access support, wherein the terminal IP address set
comprises different terminal IP addresses correspond-
ing to the data flows in the data flow group; the quantity
of data flows is a quantity of the data flows comprised
in the data flow group; the time mode information
indicates a preset time mode that the data flow group is
in, and different preset time modes are in a one-to-one
correspondence with preset time ranges; the access
mode identifier identifies a preset access mode that the
data flow group is in; the flow support is determined
based on the quantity of the data flows in the data flow
group and a total quantity of the data flows within the
first time period; and the device access support is
determined based on a quantity of terminals corre-
sponding to the data flow group and a total quantity of
terminals corresponding to the data flows within the
first time period.
11. The apparatus according to claim 10, wherein the
group parameters identify an abnormal data flow or are used
to determine a security rule, and the security rule is used to
control forwarding of a data flow.
12. The apparatus according to claim 11, wherein the
apparatus is a management device or a component of the
management device, and the management device stores
group parameters of historical data flow groups; and the at
least one processor is configured to execute the instructions
to further cause the apparatus to:
receive a query request sent by a third device, wherein the
query request indicates a query condition, and the
query condition comprises a flow support threshold
and/or a device access support threshold;
determine a target group parameter from the group param-
eters of the historical data flow groups, wherein a flow
support of the target group parameter satisfies the flow
support threshold and/or a device access support of the
target group parameter satisfies the device access sup-
port threshold; and
send the target group parameter to the third device.
13. The apparatus according to claim 10, wherein the at
least one preset access mode comprises one or more of the
following modes: a first access mode, a second access mode,
or a third access mode, wherein
a relationship between data flows in a data flow group in
the first access mode satisfies a first flow parameter
rule, and the first flow parameter rule comprises: for the
data flows in the data flow group, protocol types are
same, terminal port numbers are different, server port
numbers are same, and server IP addresses are same; or
for the data flows in the data flow group, protocol types
are same, terminal port numbers are different, server
port numbers are same, and server IP addresses belong
to a same preset IP address group;
a relationship between data flows in a data flow group in
the second access mode satisfies a second flow param-
eter rule, and the second flow parameter rule comprises:
for the data flows in the data flow group, protocol types
are same, server port numbers are different, terminal
port numbers are same, and server IP addresses are
same; or for the data flows in the data flow group,
protocol types are same, server port numbers are different, terminal port numbers are same, and server IP addresses belong to a same preset IP address group; and a relationship between data flows in a data flow group in the third access mode satisfies a third flow parameter rule, and the third flow parameter rule comprises: for the data flows in the data flow group, protocol types are same, server port numbers are different, terminal port numbers are different, and server IP addresses are same; or for the data flows in the data flow group, protocol types are same, server port numbers are different, terminal port numbers are different, and server IP addresses belong to a same preset IP address group.

14. The apparatus according to claim 13, wherein the at least one preset access mode comprises the first access mode and the second access mode and the at least one processor is configured to execute the instructions to further cause the apparatus to:

determine, according to the flow parameters of the plurality of data flows within the first time period, the data flow group in the first access mode, and determine, according to flow parameters of remaining data flows, the data flow group in the second access mode.

15. The apparatus according to claim 14, wherein the at least one preset access mode further comprises the third access mode and the at least one processor is configured to execute the instructions to further cause the apparatus to:

determine the data flow group in the third access mode based on data flows that are in the plurality of data flows within the first time period and that are other than the data flows in the data flow groups in the first access mode and the second access mode.

16. The apparatus according to claim 13, wherein the at least one processor is configured to execute the instructions to further cause the apparatus to:

obtain group parameters of a plurality of data flow groups that are determined according to flow parameters of data flows within a plurality of time periods, wherein the plurality of time periods comprise the first time period; and combine at least two data flow groups in the plurality of data flow groups, and determine group parameters of a combined data flow group according to the group parameters of the at least two data flow groups, wherein a relationship between data flows in the at least two data flow groups satisfies the first flow parameter rule or the second flow parameter rule.

17. The apparatus according to claim 16, wherein the at least one processor is configured to execute the instructions to further cause the apparatus to:

obtain flow parameters of a first data flow within the plurality of time periods, wherein the first data flow is a data flow that is in the plurality of data flows within the plurality of time periods and that does not belong to any data flow group within the plurality of time periods; and when it is determined that a relationship between the first data flow and data flows in one data flow group within the plurality of time periods satisfies the first flow parameter rule or the second flow parameter rule, add the first data flow to the data flow group, and update the group parameters of the data flow group according to the flow parameters of the first data flow.

18. The apparatus according to claim 10, wherein the apparatus is a forwarding device or a component of the forwarding device, or the apparatus connected to the forwarding device in bypass mode, and the at least one processor is configured to execute the instructions to further cause the apparatus to:

send group parameters of a data flow group that are determined by the apparatus to a management device.

19. The apparatus according to claim 10, wherein the apparatus is a management device or a component of the management device, the flow parameters of the plurality of data flows within the first time period are from a plurality of second devices, and the plurality of second devices comprise at least one of a forwarding device or a device connected to the forwarding device in bypass mode.

20. One or more non-transitory computer-readable media storing computer instructions, that when executed by one or more processors, cause a computing device to perform operations comprising:

obtaining flow parameters of a plurality of data flows within a first time period, wherein the flow parameters comprise a protocol type, a terminal port number, a server internet protocol (IP) address, and a server port number;

obtaining at least one data flow group according to a flow parameter rule of at least one preset access mode and the flow parameters of the plurality of data flows, wherein a relationship between data flows in each data flow group satisfies a flow parameter rule of one preset access mode; and determining group parameters of each data flow group, wherein the group parameters comprise a server IP address, a server port number range, a terminal port number range, and a protocol type, and the group parameters of the data flow group are determined according to the flow parameters of the data flows comprised in the data flow group, and wherein the group parameters further comprise at least one of the following: a terminal IP address set, a quantity of data flows, time mode information, an access mode identifier, a flow support, or a device access support, wherein the terminal IP address set comprises different terminal IP addresses corresponding to the data flows in the data flow group; the quantity of data flows is a quantity of the data flows comprised in the data flow group; the time mode information indicates a preset time mode that the data flow group is in, and different preset time modes are in a one-to-one correspondence with preset time ranges; the access mode identifier identifies a preset access mode that the data flow group is in; the flow support is determined based on the quantity of the data flows in the data flow group and a total quantity of the data flows within the first time period; and the device access support is determined based on a quantity of terminals corresponding to the data flow group and a total quantity of terminals corresponding to the data flows within the first time period.

* * * * *